United States Patent
Kabasawa

[11] Patent Number: 6,014,358
[45] Date of Patent: Jan. 11, 2000

[54] RECORDING MEDIUM CARTRIDGE LOADING DEVICE

[75] Inventor: Hidetoshi Kabasawa, Saitama-Ken, Japan

[73] Assignee: TEAC Corporation, Tokyo, Japan

[21] Appl. No.: 08/831,928

[22] Filed: Apr. 2, 1997

[30] Foreign Application Priority Data

Apr. 4, 1996 [JP] Japan .................................. 8-082673
Dec. 27, 1996 [JP] Japan .................................. 8-351372

[51] Int. Cl.$^7$ .......................... G11B 17/022; G11B 17/04
[52] U.S. Cl. .......................................... 369/77.2; 369/75.2
[58] Field of Search ............................... 369/75.1, 75.2, 369/77.1, 77.2; 360/99.02, 99.03, 99.06, 99.07

[56] References Cited

U.S. PATENT DOCUMENTS

| | | | |
|---|---|---|---|
| 5,485,330 | 1/1996 | Hirose et al. | 360/99.06 |
| 5,504,730 | 4/1996 | Kanada | 369/77.2 |
| 5,537,271 | 7/1996 | Kumai et al. | 369/77.2 |
| 5,537,376 | 7/1996 | Ikuma | 369/77.2 |
| 5,546,370 | 8/1996 | Ishikawa | 369/77.2 |
| 5,586,092 | 12/1996 | Seo | 369/77.2 |

FOREIGN PATENT DOCUMENTS

| | | |
|---|---|---|
| 1-45148 | 10/1989 | Japan . |
| 8-180544 | 7/1996 | Japan . |

*Primary Examiner*—David L. Ometz
*Attorney, Agent, or Firm*—Andrus, Sceales, Starke & Sawall

[57] ABSTRACT

A frame supports a holder so that the holder may move in an insertion direction and then may move in a loading direction approximately perpendicular to the insertion direction after reaching a turning position. An approximately L-shaped elastic member is provided. An extending end of one arm of the elastic member is connected to the frame and an extending end of the other arm of the elastic member is connected to the holder. When the recording medium cartridge is inserted into the holder, the holder moves in the insertion direction and the angle between the two arms of the elastic member decreases, the holder then reaching the turning position. After the holder reaches the turning position, the elastic member pushes and moves the holder in the loading direction and the angle between the two arms of the elastic member increases, the holder then reaching a cartridge loaded position.

4 Claims, 28 Drawing Sheets

$\alpha_2 < \alpha_1$ $\alpha_3 > \alpha_2$ $\alpha_4 > \alpha_3$

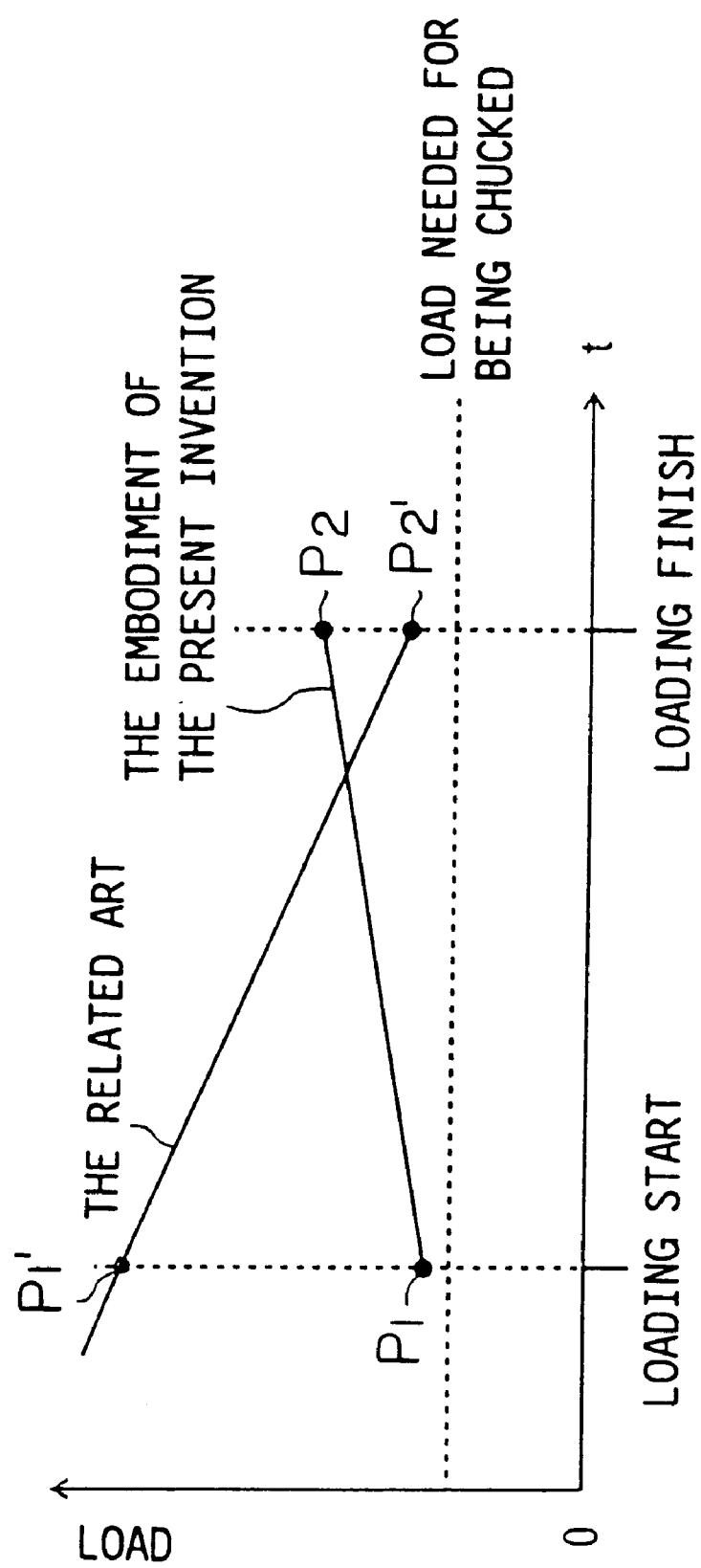

RECORDING MEDIUM CARTRIDGE LOADING DEVICE

BACKGROUND OF THE INVENTION

1. Field of the Invention

The present invention relates to a recording medium cartridge loading device, and, in particular, to a recording medium cartridge device which is applied to a magneto-optical disk apparatus, a floppy disk apparatus, and a video tape recorder, and in which, by a force of inserting a recording medium cartridge, a holder at first moves horizontally, then, moves downwardly, and the recording medium cartridge is loaded in a predetermined position.

A magneto-optical disk apparatus, a floppy disk apparatus, a video tape recorder and so forth include recording medium cartridge loading devices for loading a cartridge containing a disk or tape in a predetermined position.

It is required that a recording medium cartridge loading device positively performs loading of a cartridge, and also, smoothly removes a loaded cartridge.

The present invention also relates to a disk cartridge loading device, and, in particular, to a disk cartridge loading device in which, by a movement of a sliding member which slides as a disk cartridge is inserted into a holder, the holder is moved from a cartridge insertion and ejection position to a cartridge loaded position.

2. Description of Related Art

FIGS. 1, 2A, 2B show an outline of a cartridge loading device 10 in an example of related art disclosed in Japanese Patent Publication No.1-45148.

In the outline, the cartridge loading device includes a base 11, a holder 12 and an ejection member 13.

The holder 12 is supported above the base 11 so that, by pins 14, 15 and guiding cut-out portions 16, 17, the holder 12 at first moves in a Y1 (horizontal) direction, and then, moves in a Z2 (downward) direction.

The ejection member 13 is provided to the base 11 movably in the Y1 direction. The ejection member 13 has oblique cams 18 and 19 which stand. As shown in FIG. 2B, the cams 18 and 19 are positioned near a side wall of the holder 12.

A tension coil spring 20 is obliquely provided between the holder 12 and the base 11 and is hooked on the holder 12 and the base 11.

When a cartridge 30 is, as shown in FIG. 2A, inserted into the holder 12 which is positioned at a cartridge insertion and ejection position, the holder 12 moves as a result of being pressed by the cartridge 30. By the pins 14, 15 and guiding cut-out portions 16, 17, each being approximately L shaped, the holder 12 at first moves in the Y1 direction, and then, moves in the Z2 direction by the force of the tension coil spring 20. The holder 12 reaches a cartridge loaded position shown in FIG. 3A together with the cartridge 30, and the cartridge is loaded.

In the state shown in FIG. 3A, when the ejection member 13 is pushed in the Y1 direction, the oblique cams 18, 19 push up the pins 14, 15, and the holder 12 is caused to move in a Z1 (upward) direction. Then, the holder 12 is caused to move in a Y2 direction by the force of the tension coil spring 20, and reaches the cartridge insertion and ejection position, and, the cartridge 30 may be removed.

As shown in FIG. 2A, in the cartridge loading device 10, the force F1 which causes the holder 12 to move in the Z2 direction and the force F2 which causes the holder 12 to move in the Y2 direction are the Z2-direction component and Y2-direction component of the spring force F of the tension coil spring 20, respectively.

The angle of the tension coil spring 20 does not change remarkably when the holder 12 moves. Therefore, efficiency of obtaining the forces F1 and F2 from the spring force F of the tension coil spring 20 is not good. Thereby, movement of the holder 12 when the movement direction is changed from the Y1 direction to the Z2 direction, that is, starting of the Z2 direction movement of the holder 12, may not be performed smoothly. In order for the holder 12 to perform the starting of the Z2 movement smoothly, the spring force F of the tension coil spring 20 is large.

However, because the spring force F of the tension coil spring 20 is large, the speed at which the holder 12 moves in the Z2 direction is high so that the disk contained in the cartridge 30 is strongly hit by the magnetic heads of the disk apparatus. Thereby, the magnetic heads may be damaged.

Further, because the spring force F of the tension coil spring 20 is large, the force required for moving the holder 12 in the Z1 (upward) direction is large. In addition, a large force is required for pushing and moving the ejecting member 13 in the Y1 direction.

Further, the tension coil springs 20 are provided outwardly on both sides of the cartridge loading device 10 as shown in FIG. 2B. Thus, the tension coil springs 20 project to both sides of the cartridge loading device 10 as shown in the figure. Thereby, the width W1 of the cartridge loading device 10 is large. This is disadvantageous for miniaturization of the cartridge loading device 10.

Further, a disk cartridge loading device for loading a disk cartridge which contains a flexible magnetic disk includes a holder into which the disk cartridge is inserted and a slider, acting as a sliding member, which slides by a disk cartridge inserting operation and moves the holder from a cartridge insertion and ejection position to a cartridge loaded position.

A force is applied to the slider in one direction by a coil spring or the like and is prevented from moving by a latch lever. When the disk cartridge is inserted, a latch lever is pushed by an end of the disk cartridge and rotates, and the prevention of moving of the slider by the latch lever is released. Thereby, the slider slides in the above-mentioned direction in which the force is applied to the slider, and the holder is caused to move to the cartridge loaded position. At this time, the holder falls from the cartridge insertion and ejection position to the cartridge loaded position, and thereby, the disk in the disk cartridge is caused to be chucked onto the turntable of the disk apparatus.

The loading operation of the holder is performed by the spring force of a coil spring, which force is also used to apply power to the slider. This coil spring is pulled to be longest when the holder is at the cartridge insertion and ejection position. When the holder falls to the cartridge loaded position, the slider slides and the length of the coil spring is shortened. In order to obtain a sufficient holding force by the coil spring when the holder is at the cartridge loaded position, the spring force of the coil spring is large. As a result, the spring force of the coil spring when the holder is at the cartridge insertion and ejection position is considerably strong.

However, the slider is accelerated by the strong spring force from the cartridge insertion beginning to the cartridge loading. Therefore, when the slider reaches the sliding completion position, the disk in the disk cartridge is hit by the magnetic heads of the disk apparatus so strongly that the disk surfaces may be damaged.

In order to decelerate the sliding motion of the slider, a damper is provided. As such a type of a damper, there is an oil damper which includes a gear which engages with a rack provided on the slider, a rotation body which rotates together with the gear, and a container which is filled with grease and contains the rotation body. In the oil damper, when the rotation body rotates in the container as a result of the sliding motion of slider, by the viscous drag of the grease, a deceleration effect occurs. As a result, the sliding motion of the slider is decelerated.

In such an oil damper, to obtain the sufficient deceleration effect, it is necessary to increase the diameter of the rotation body. As a result, a space required for providing the oil damper increases. Such an oil damper should be provided at a position such that the oil damper may not disturb the loading operation of the holder. Therefore, it is necessary to provide a space for the oil damper in the rear of the holder.

Thus, such an oil damper required a large space, and therefore, miniaturization of the disk apparatus is difficult. Further, such an oil damper is expensive.

Further, the viscosity of the oil of such an oil damper depends on temperature. Accordingly, in low temperature, the viscous drag is so large that it may not be possible to positively load the disk. In high temperature, the viscous drag is so small that the loading operation force may be so strong that the disk may be damaged.

SUMMARY OF THE INVENTION

An object of the present invention is to provide a recording medium loading device in which the problems mentioned above with reference to FIGS. 1, 2A, 2B, 3A and 3B are solved.

A recording medium cartridge loading device according to one aspect of the present invention comprises:

a holder;

a frame for supporting the holder so that the holder may move in an insertion direction and then may move in a loading direction approximately perpendicular to the insertion direction after reaching a turning position; and an approximately L-shaped elastic member, an extending end of one arm of the elastic member being connected to the frame and an extending end of the other arm of the elastic member being connected to the holder, wherein:

when the recording medium cartridge is inserted into the holder, the holder moves in the insertion direction and the angle between the two arms of the elastic member decreases, the holder then reaching the turning position; and after the holder reaches the turning position, the elastic member pushes and moves the holder in the loading direction and the angle between the two arms of the elastic member increases, the holder then reaching a cartridge loaded position.

In this arrangement, the approximately L-shaped elastic member efficiently provides a force to push and move the holder to the cartridge loaded position. Accordingly, the elastic member of a weak force can be used. Thereby, it is possible that the holder moves to the cartridge loaded position slowly. This eliminates provision of a damper or the like. Therefore, the costs of the device can be reduced. Further, an operator should apply merely a weak force to an ejection button for a loaded cartridge to be ejected. Furthermore, by using such an approximately L-shaped elastic member in the two sides of the loading device, a side projecting amount due to the elastic member is very small in comparison to a case where a coil spring, such as the coil spring 20 shown in FIGS. 1, 2A, 2B, 3A and 3B, is used for the same purpose. Thereby, the width of the device can be reduced.

Another object of the present invention is to provide a disk cartridge loading device in which the above-mentioned problems occurring in such an arrangement in which an oil damper is used are solved.

A disk cartridge loading device, according to another aspect of the present invention, comprises:

a sliding member which slides when a disk cartridge is inserted in a holder;

a chassis for supporting the sliding member in a manner such that the sliding member can slide with respect to the chassis, the holder moving between a cartridge insertion and ejection position and a cartridge loaded position by the sliding operation of the sliding member; and a pushing member, one end of the pushing member being hooked to the holder and the other end of the pushing member being hooked to the chassis, wherein the pushing member is such that, during a process in which the holder moves from the cartridge insertion and ejection position to the cartridge loaded position with the sliding operation of the sliding member, a force with which the pushing member pushes the holder to the loaded position increases gradually.

According to the present invention, pushing member is such that, during a process in which the holder moves from the cartridge insertion and ejection position to the cartridge loaded position with the sliding operation of the sliding member, a force with which the pushing member pushes the holder to the loaded position increases gradually. Thereby, a cartridge loading operation can be positively performed. The spring force of a spring which applies a force to the sliding member can be reduced, and thereby, a shock when magnetic heads hit disk surfaces can be reduced. Thus, it is prevented that disk surfaces are damaged. Further, by reducing the spring force of the spring which applies a force to the sliding member, it is not necessary to provide the oil damper. As a result, the disk cartridge loading device can be miniaturized, and also, the costs thereof can be reduced.

Other objects and further features of the present invention will become more apparent from the following detailed description when read in conjunction with the accompanying drawings.

BRIEF DESCRIPTION OF THE DRAWINGS

FIG. 33 shows a graph of chucking load change in the case of the second embodiment of the present invention and chucking load change in the case of the related art.

DETAILED DESCRIPTION OF THE PREFERRED EMBODIMENTS

Figure 1:
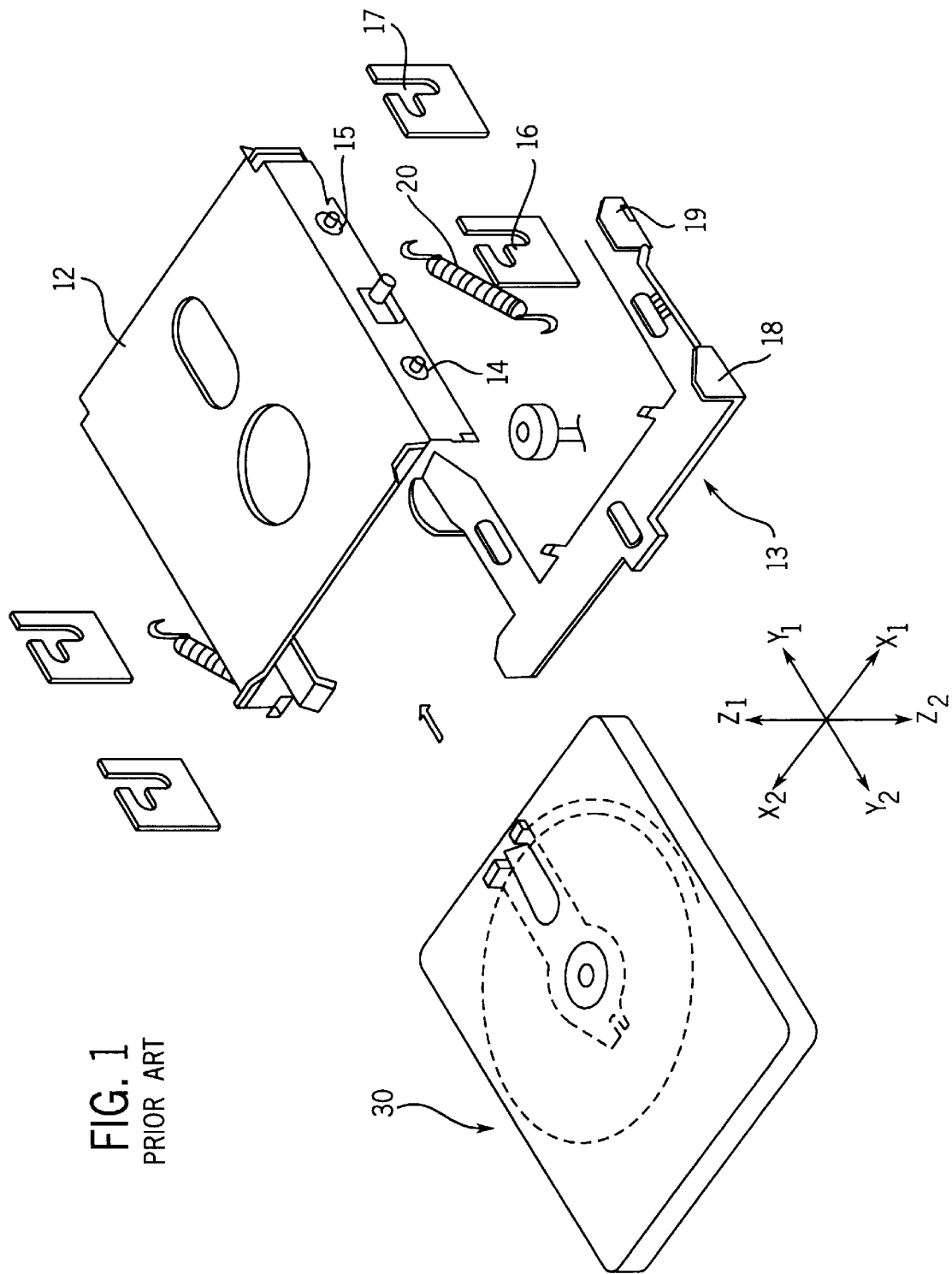
FIG. 1 shows an exploded perspective view of a magnetic disk cartridge in one example of the related art.
Figure 2A:
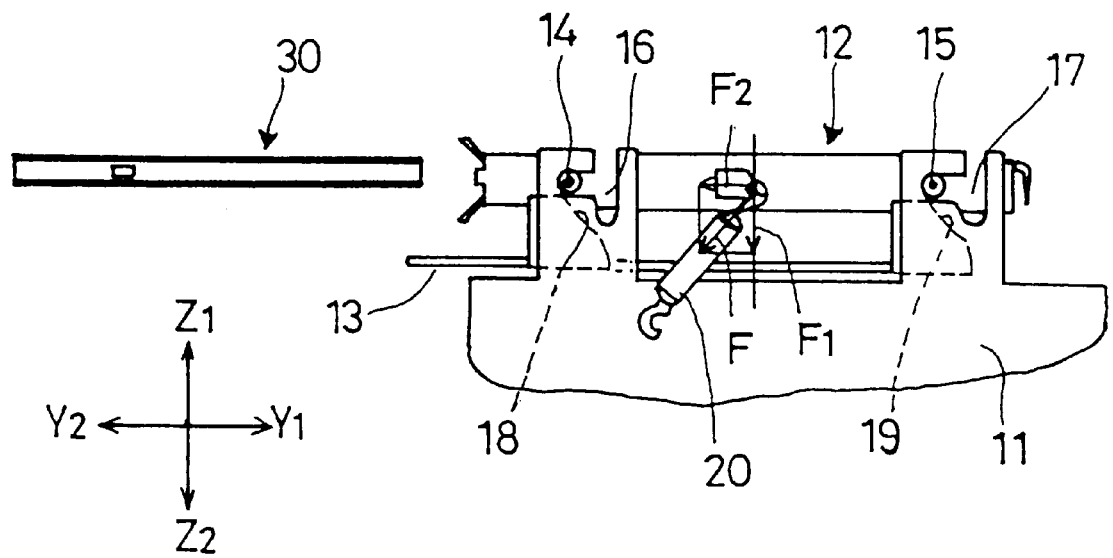
FIGS. 2A and 2B show a side view and a front view, respectively, of the device shown in FIG. 1.
Figure 2B:
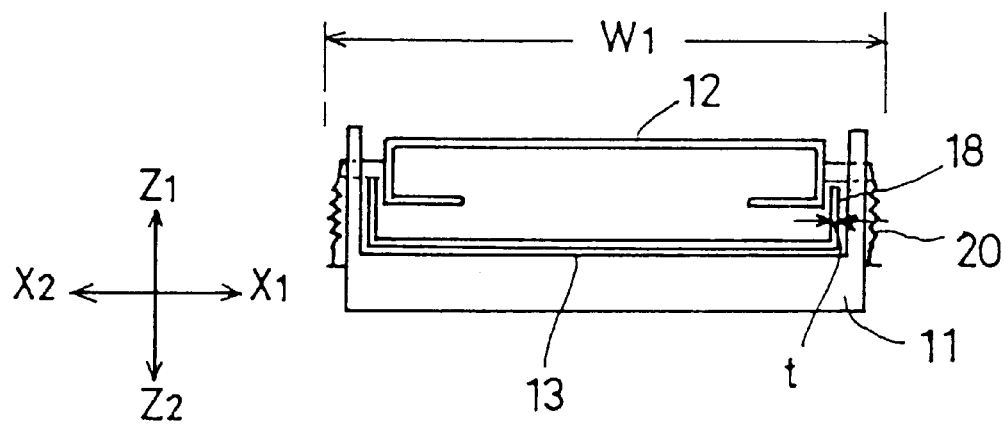
Figure 3A:
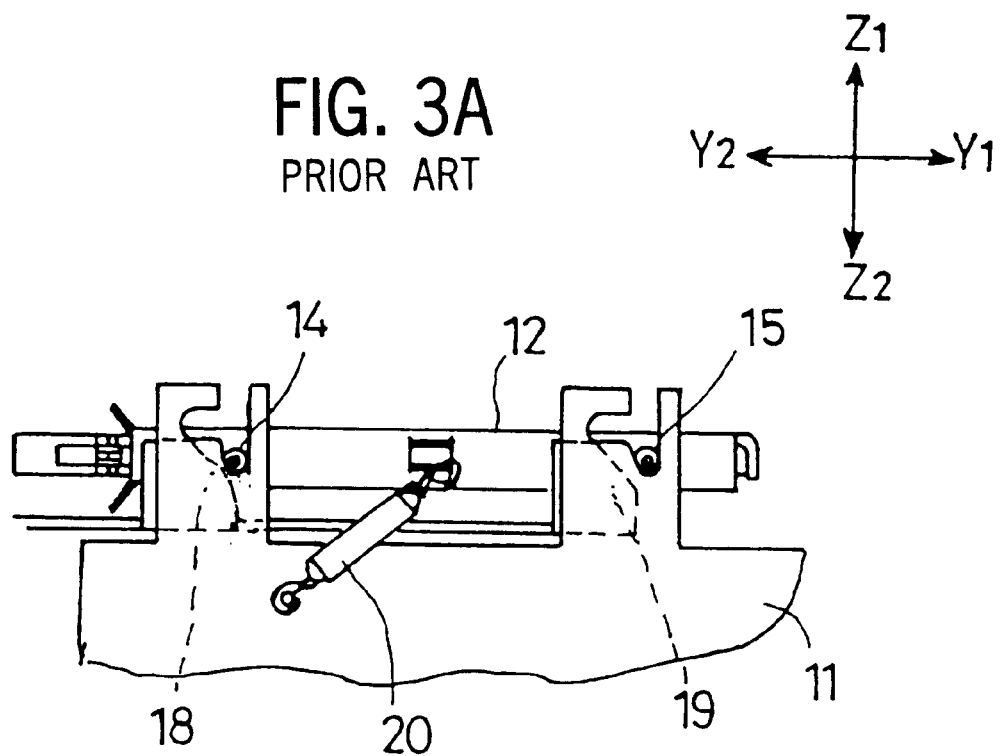
FIGS. 3A and 3B show an operation of the device shown in FIG. 1.
Figure 3B:
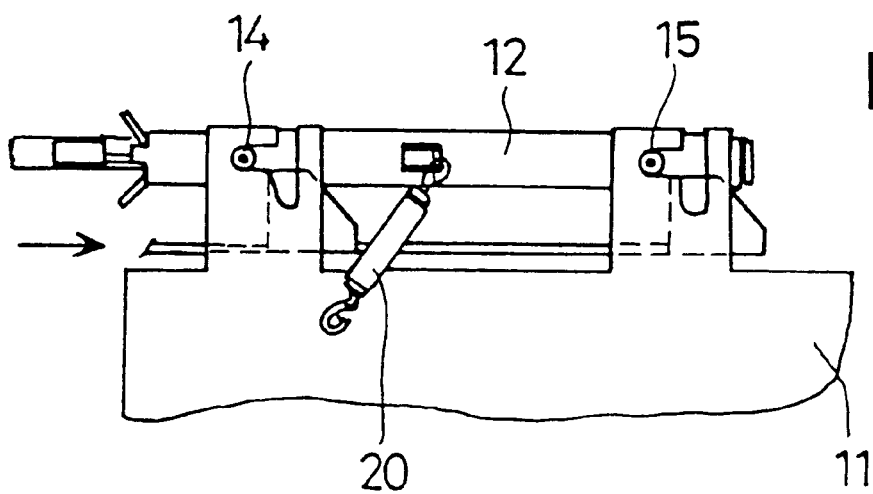
Figure 4:
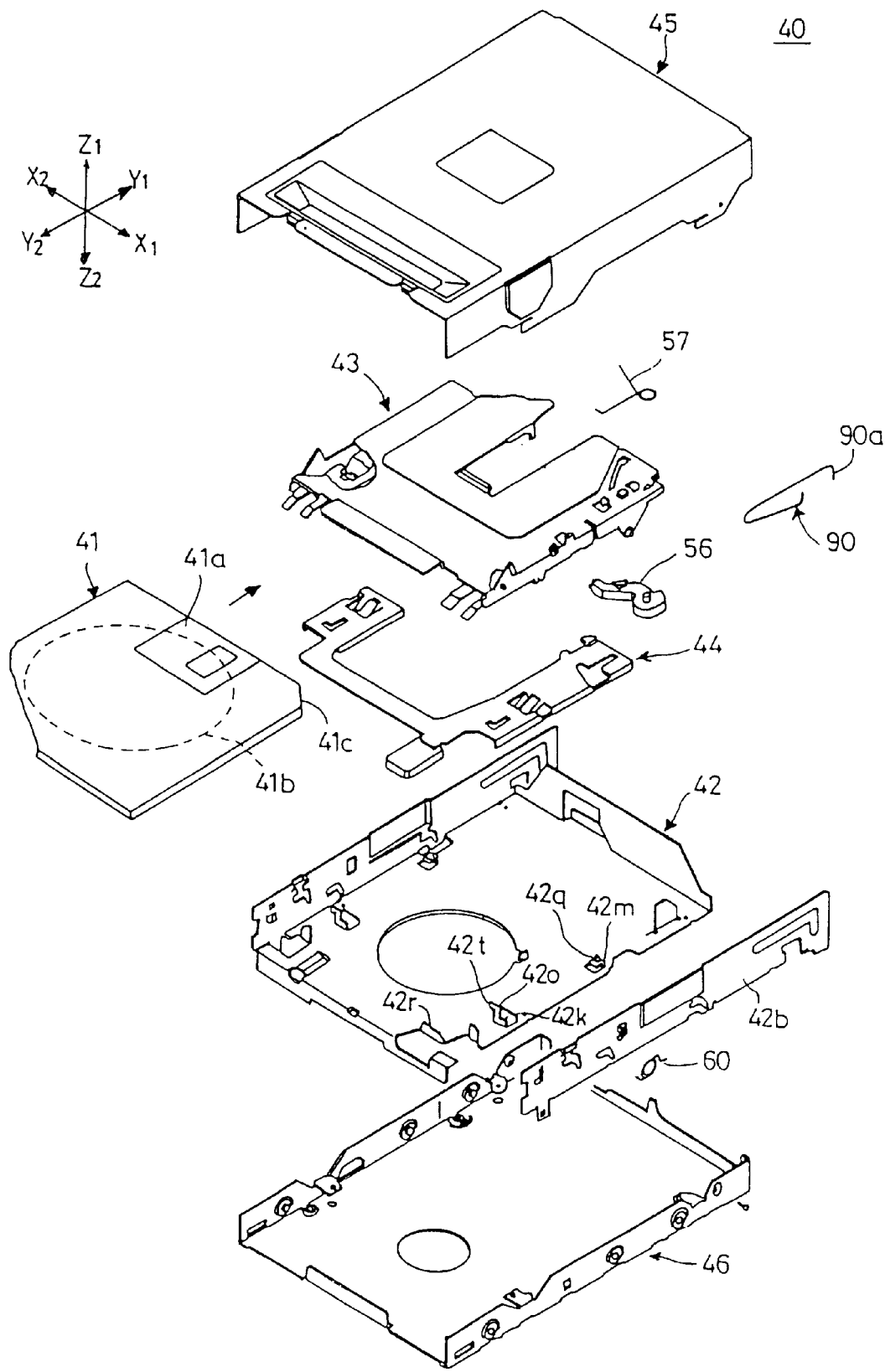
FIG. 4 shows an exploded perspective view of a magnetic disk cartridge loading device in a first embodiment of the present invention.
Figure 5:
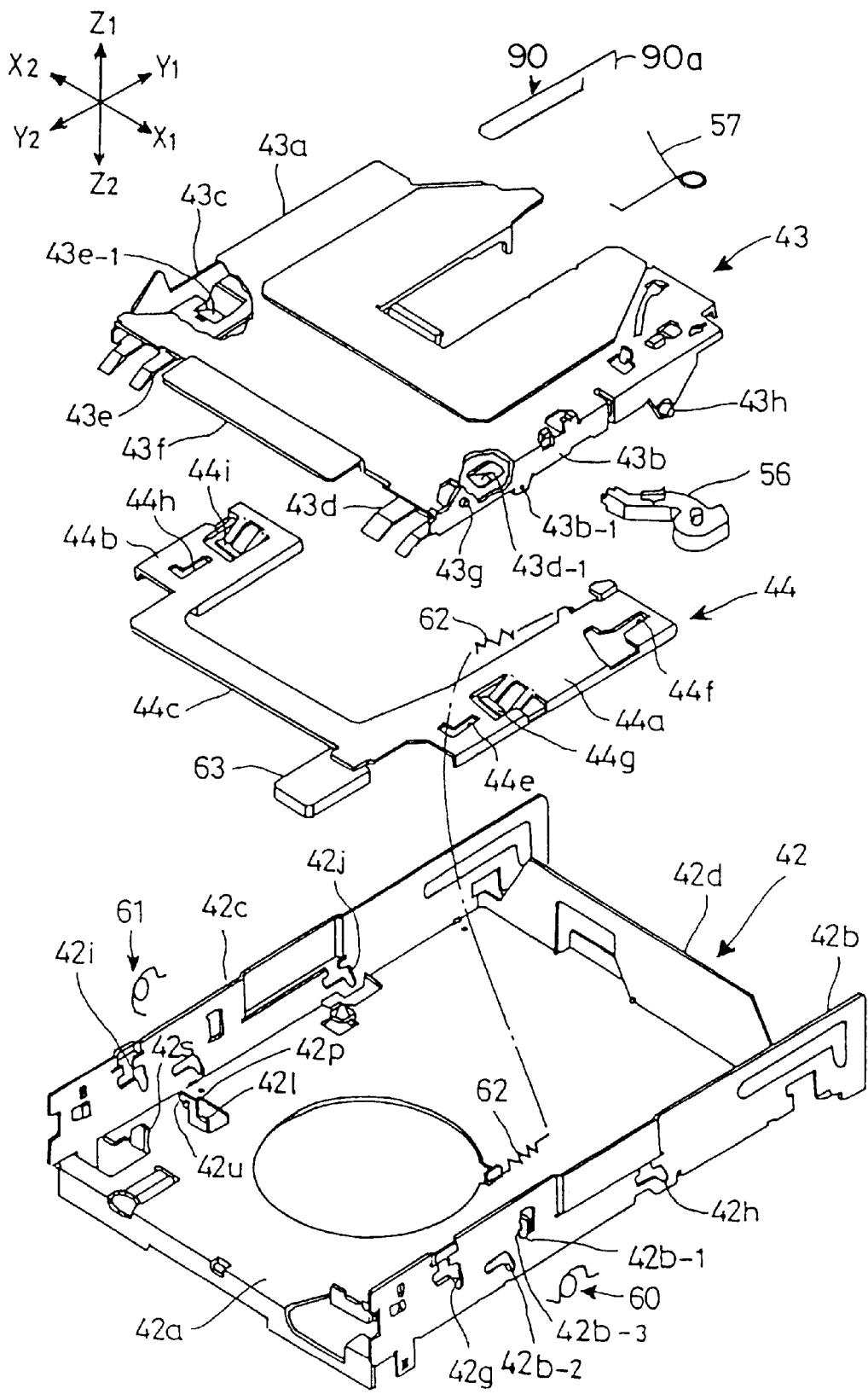
FIG. 5 shows an exploded perspective view of a frame, a holder and an ejection member of the device shown in FIG. 4.
Figure 6:
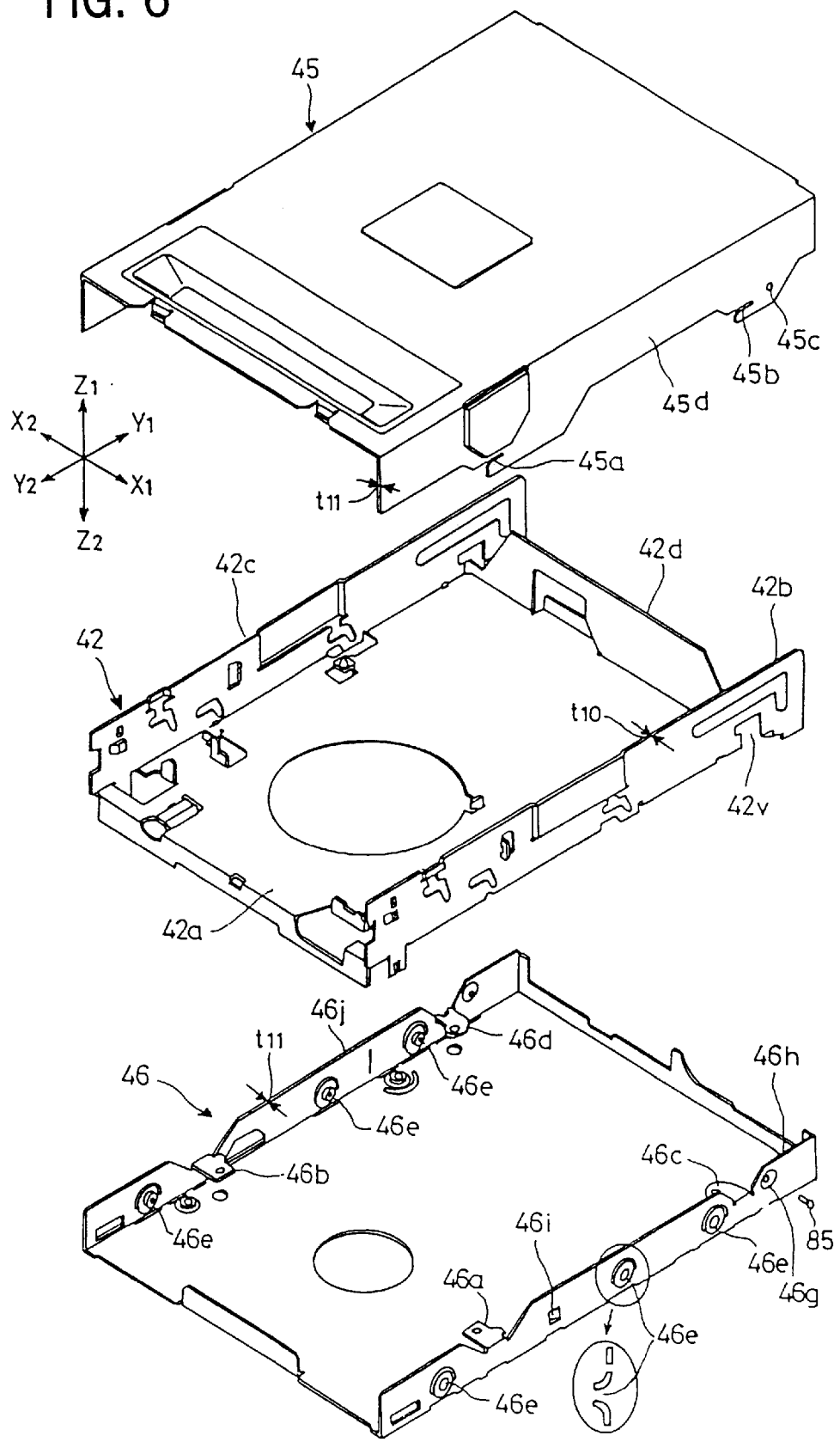
FIG. 6 shows an exploded perspective view of a frame, an upper cover and a lower cover of the device shown in FIG. 4.

FIGS. 4, 5, 6, 7, 8, 9 and 10 show a magnetic disk cartridge loading device 40 in a first embodiment of the present invention. FIGS. 4, 5 and 6 show exploded views of the device.

As shown in FIG. 4, the magnetic disk cartridge loading device 40 is a device for loading a 3.5-inch magnetic disk cartridge 41, and, in outline, includes a frame 42, a holder 43, an ejection member 44, an upper cover 45, and a lower cover 46.

Figure 9:
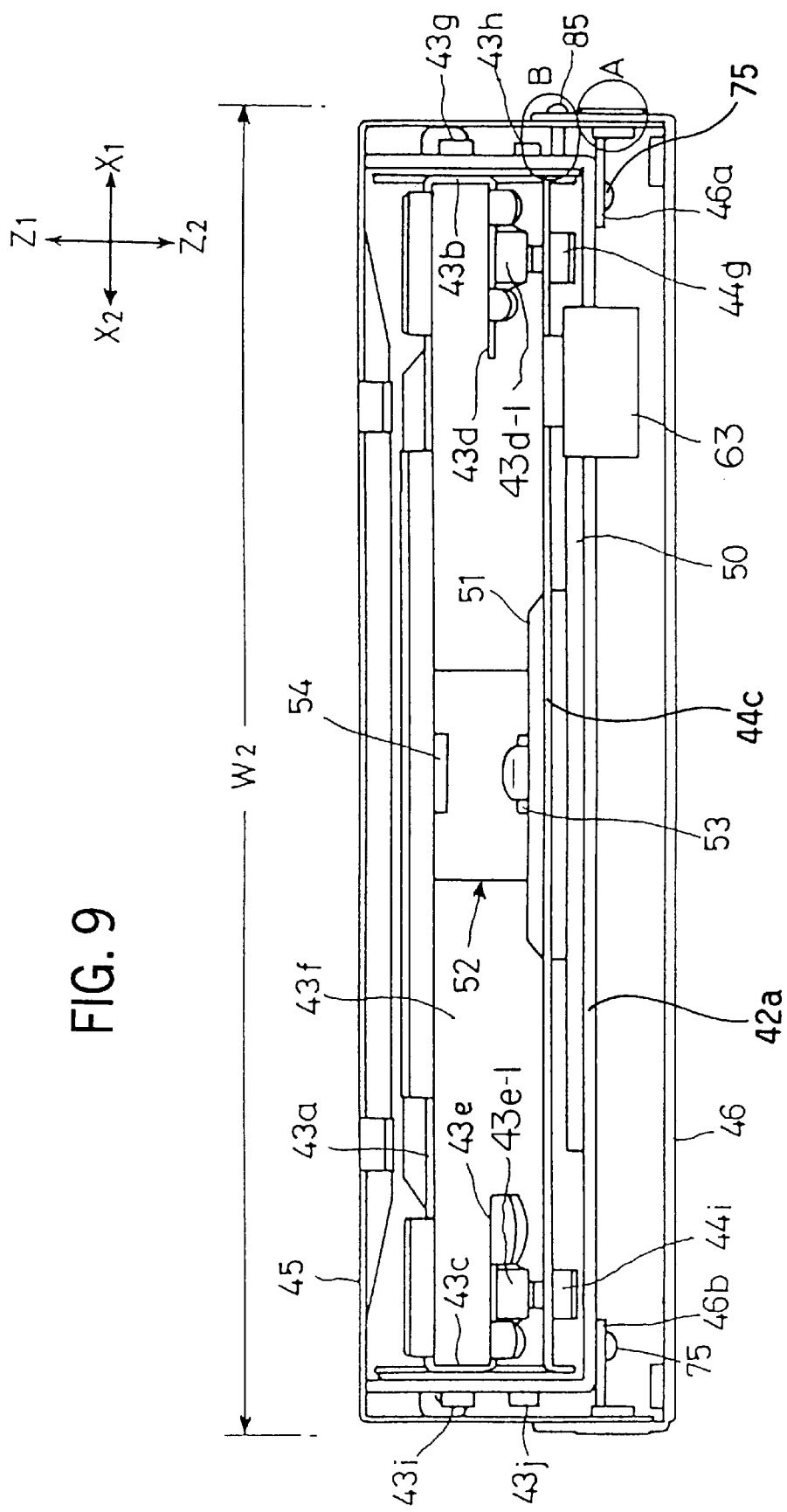
FIG. 9 shows a magnified front view of the device of FIG. 7.
Figure 10:
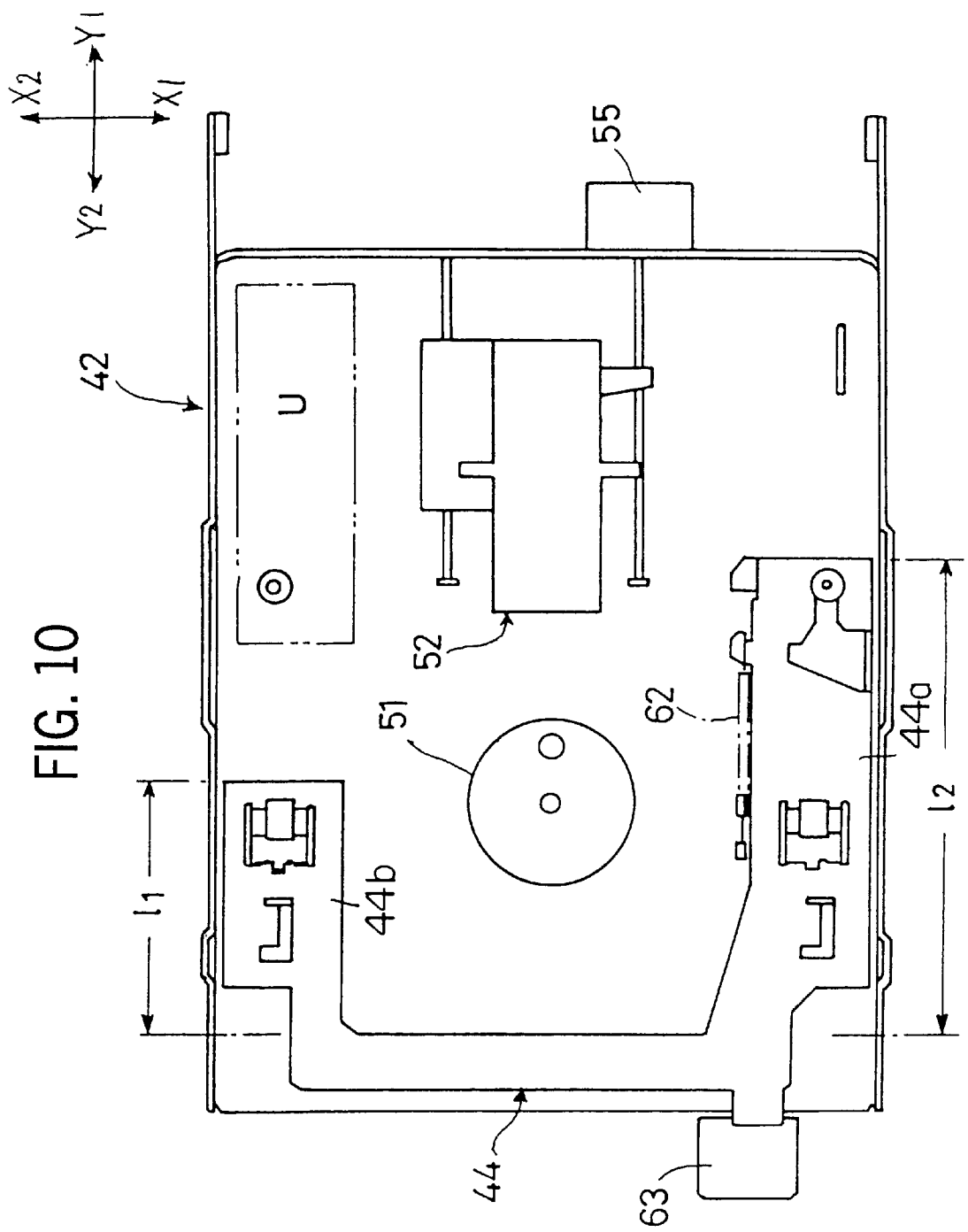
FIG. 10 shows a plan view of the device shown in FIG. 6 after a holder is removed.

As shown in FIGS. 4 and 5, in outline, the frame 42 includes a bottom plate portion 42a, side wall portions 42b, 42c on both sides, and a rear wall portion 42d. As shown in FIGS. 9 and 10, on the frame 42, a flat motor 50, a turntable 51 which is rotated by the motor 50, and a head carriage 52 are mounted. The head carriage 52 has a lower head 53 and an upper head 54 as shown in FIG. 9. The head carriage 52 is moved by a motor 55 shown in FIG. 10 in the Y1, Y2 directions.

Figure 7:
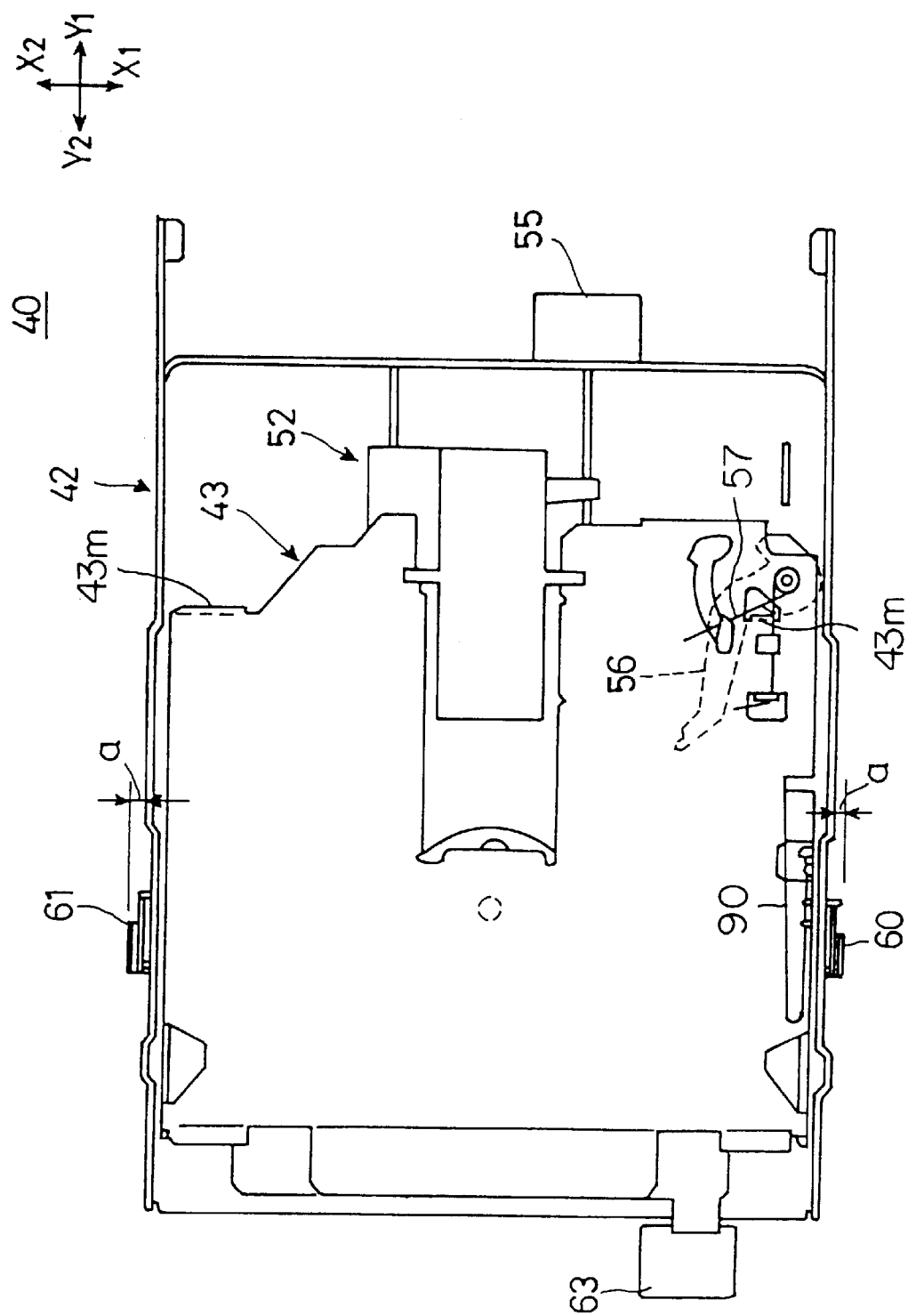
FIG. 7 shows a plan view of the magnetic disk cartridge loading device shown in FIG. 4.

As shown in FIGS. 4, 7 and 9, in outline, the holder 43 includes a top plate portion 43a, side wall portions 43b, 43c on both sides, a bottom plate portion 43d near the side wall portion 43b, a bottom plate portion 43e near the side wall portion 43c and rear wall portions 43m near the side wall portions 43c, 43d, respectively. The holder 43 has an insertion opening 43f, at the end in the Y1 direction, for the magnetic disk cartridge to be inserted. The holder 43 holds the magnetic disk cartridge 41 which has been inserted. In the holder, a shutter opening lever 56 is assembled together with a spring 57, as shown in FIG. 7. On the side wall portion 43b of the holder 43, an insertion side pin 43g near the insertion opening 43f and a rear side pin 43h on the rear side are planted as shown in FIG. 5. As shown in FIG. 9, on the side wall portion 43c on the other side, similarly, an insertion side pin 43i and a rear side pin 43j are planted.

Figure 8:
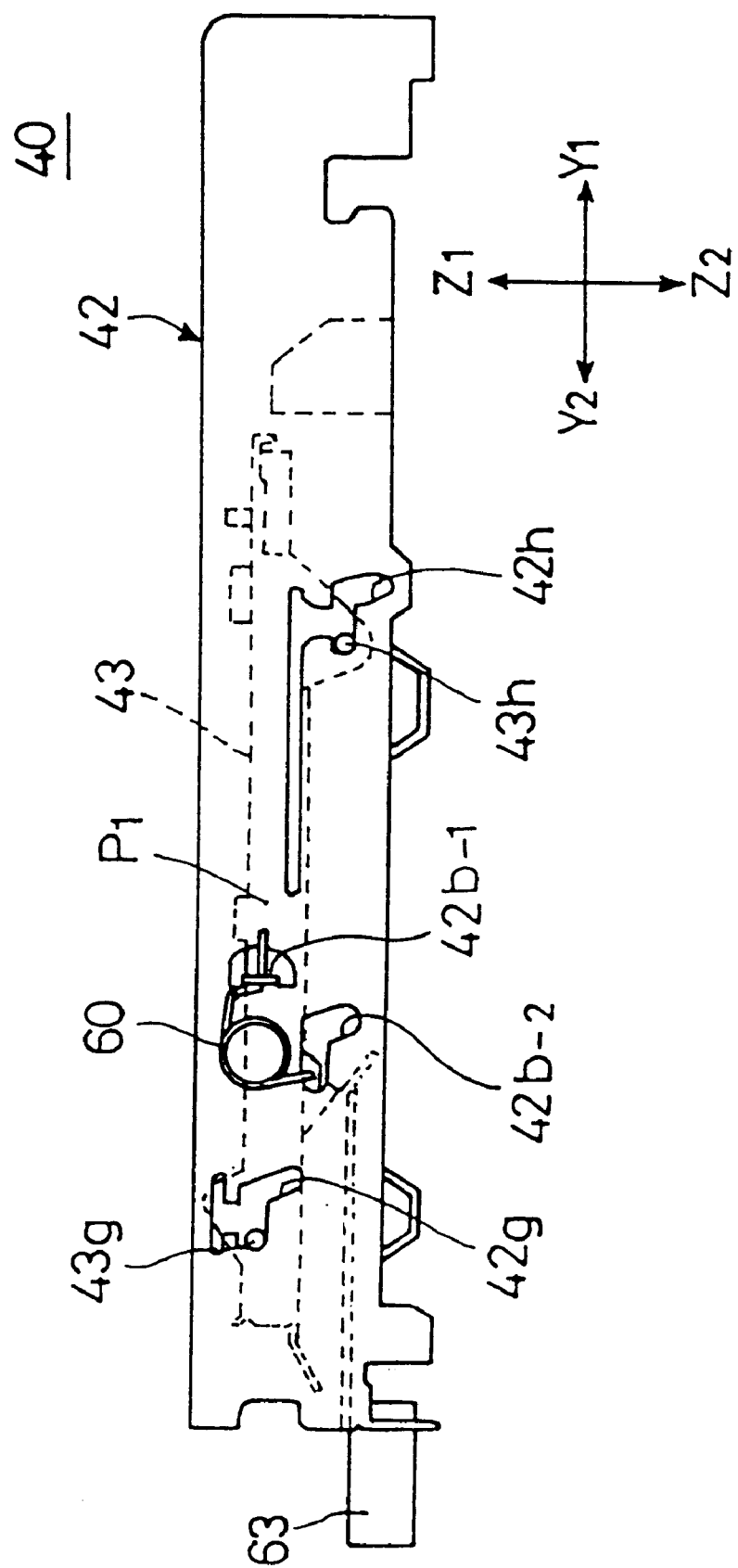
FIG. 8 shows a side view of the magnetic disk cartridge device shown in FIG. 7.

As shown in FIG. 5, in the side wall portion 42b of the frame 42, an approximately L-shaped insertion side pin guiding hole 42g for guiding the above-mentioned insertion side pin 43g and an approximately L-shaped rear side pin guiding hole 42h for guiding the above-mentioned rear side pin 43h are provided. In the side wall portion 42c of the frame 42 of the other side, an approximately L-shaped insertion side pin guiding hole 42i for guiding the above-mentioned insertion side pin 43i and an approximately L-shaped rear side pin guiding hole 42j for guiding the above-mentioned rear side pin 43j are provided. The insertion side pin 43g is inserted into the insertion side pin guiding hole 42g, the rear side pin 43h is inserted into the rear side pin guiding hole 42h, the insertion side pin 43i is inserted into the insertion side pin guiding hole 42i, and the rear side pin 43j is inserted into the rear side pin guiding hole 42j. Thus, the holder 43 is movably supported by the frame 42 along an approximately L-shaped path and is supported inside the frame 42. Further, as shown in FIGS. 7 and 8, approximately L-shaped torsion coil springs 60, 61 are provided between the frame 42 and the holder 43.

As shown in FIGS. 5 and 7, the ejection member 44 includes arm portions 44a, 44b on respective sides, a connection portion 44c for connecting the arm portions 44a, 44b, and an ejection button 63 which is fixed to the connection portion 44c. The ejection member 44 is approximately J shaped. The ejection member 44 is movable in the Y1 and Y2 directions. A spring 62 shown in FIGS. 5 and 10 pushes the ejection member 44 so that the ejection member 44 moves in the Y2 direction. As shown in FIG. 10, the length $l_1$ of the arm portion 44b is shorter than the length $l_2$ of the arm portion 44a. This arrangement is advantageous so that a space U which is provided in the Y1 direction of the extending-end of the arm portion 44b is used for mounting a printed-circuit board, for example.

As shown in FIG. 9, the ejection member 44 is provided above the bottom plate portion 42a of the frame 42 with a slight gap, and is provided below the holder 43. Further, as shown in the figure, the bottom side of the frame 42 is covered by the lower cover 46, and the top side of the frame 42 is covered by the upper cover 45.

An outline of operations of the above-described magnetic disc cartridge loading device 40 will now be described.

At first, the magnetic disk cartridge loading device 40 is in the state shown in FIGS. 4, 8 and 9. The holder 43 is in a cartridge insertion and ejection position P1, and the ejection member 44 is moved in the Y2 direction by the spring 62, and the ejection button 63 projects from the frame 42 in the Y2 direction.

Figure 11:
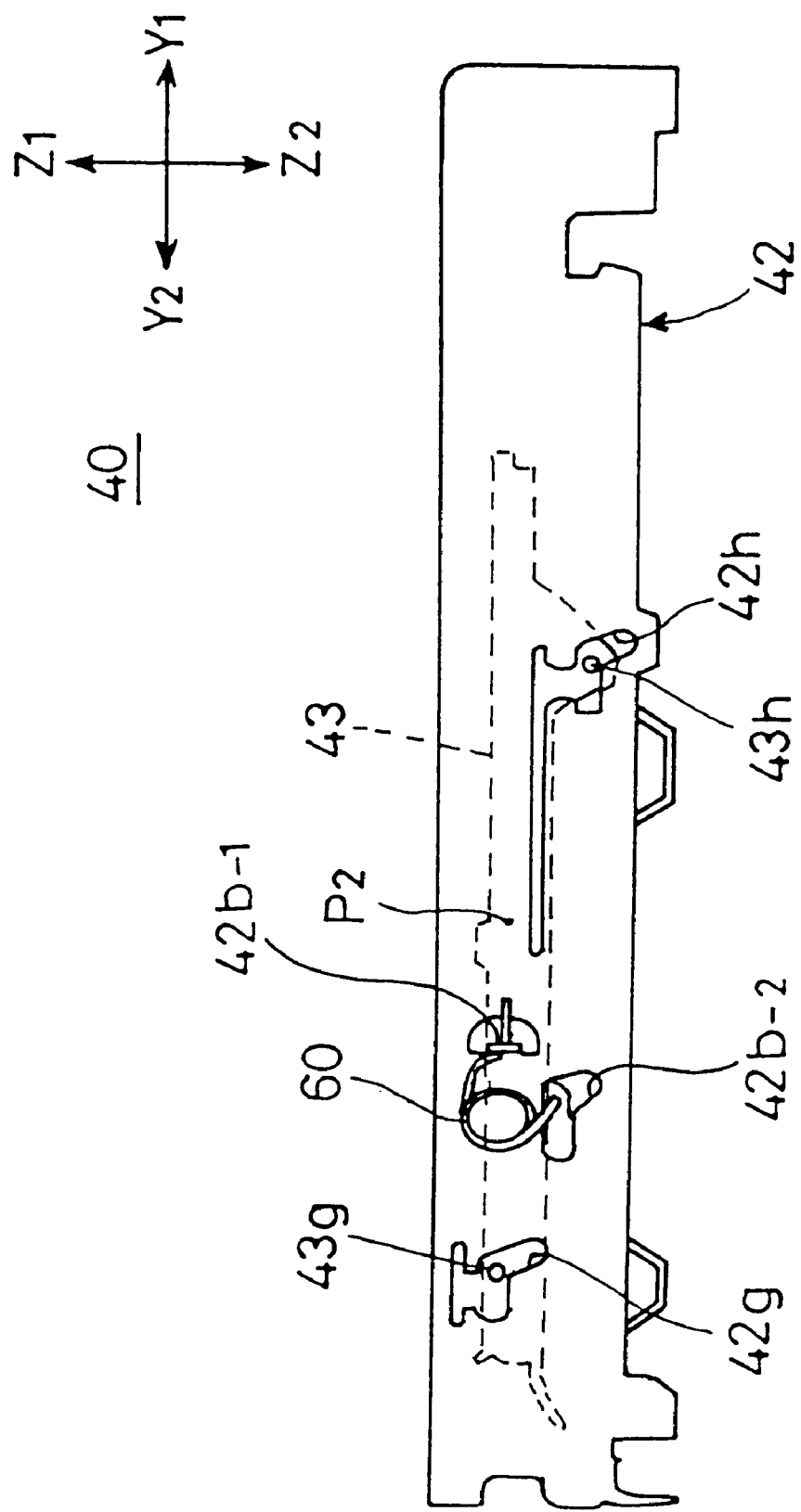
FIG. 11 shows a state where a magnetic disk cartridge is being loaded.
Figure 12:
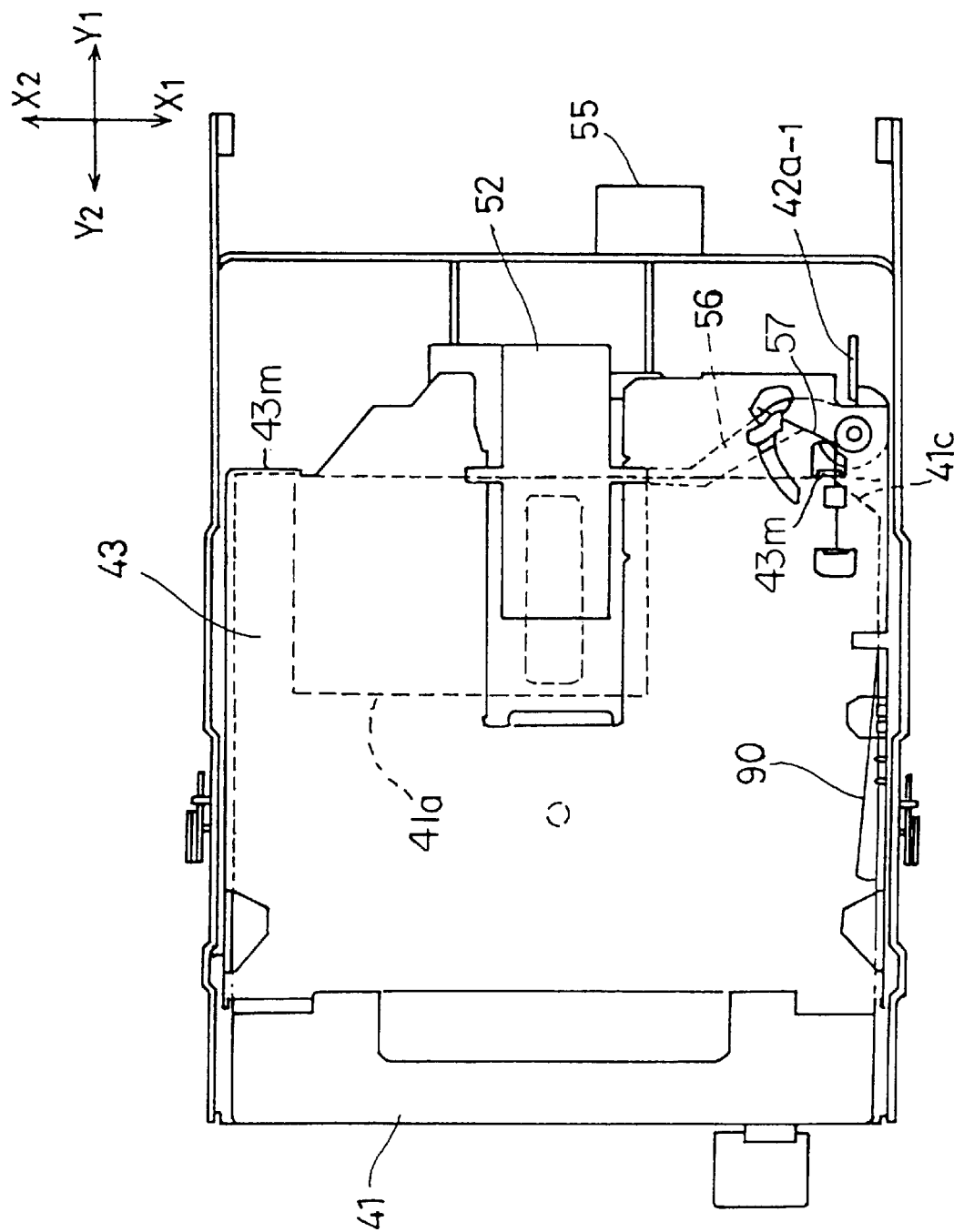
FIG. 12 shows a plan view of a state where the magnetic disk has been loaded.

When the magnetic disk cartridge 41 is inserted into the holder 43 in the Y1 direction, as shown in FIG. 12, the shutter opening lever 56 rotates, and opens a shutter 41a of the magnetic disk cartridge 41. At this time, the magnetic disk cartridge 41 pushes the rear wall portions 43m of the holder 43. Thereby, the holder is pushed by the disk cartridge 41 and moves. By the engagement between the pins 43g, 43h, 43i, 43j and the guiding holes 42g, 42h, 42i, 42j, the holder 43 at first moves in the Y1 direction until the holder 43 reaches a position P2 shown in FIG. 11. This position P2 is a position at which the Y1 direction movement of the holder 43 is finished and a Z2 direction (downward) movement of the holder 43 is started. Then, the holder 43 moves in the Z2 direction by the forces of the torsion coil springs 60, 61. The holder 43, together with the magnetic disk cartridge 41, reaches a cartridge loaded position P3 shown in FIG. 13, and the magnetic disk cartridge is loaded. As a result, a magnetic disk 41b shown in FIG. 4 contained in the magnetic disk cartridge 41 is chucked onto the turntable 51. The shutter opening lever 56 engages with a standing piece 42a-1 so that the shutter opening lever 56 is maintained at the position which the lever 56 has reached as a result of the rotation.

Then, the magnetic disk 41b is rotated on and together with the turntable 51, the head carriage 52 moves in the Y1 or Y2 direction, and information is written in the magnetic disk 41b or information is read from the magnetic disk 41b through the lower head 53 and upper head 54 of the head carriage 52.

Figure 13:
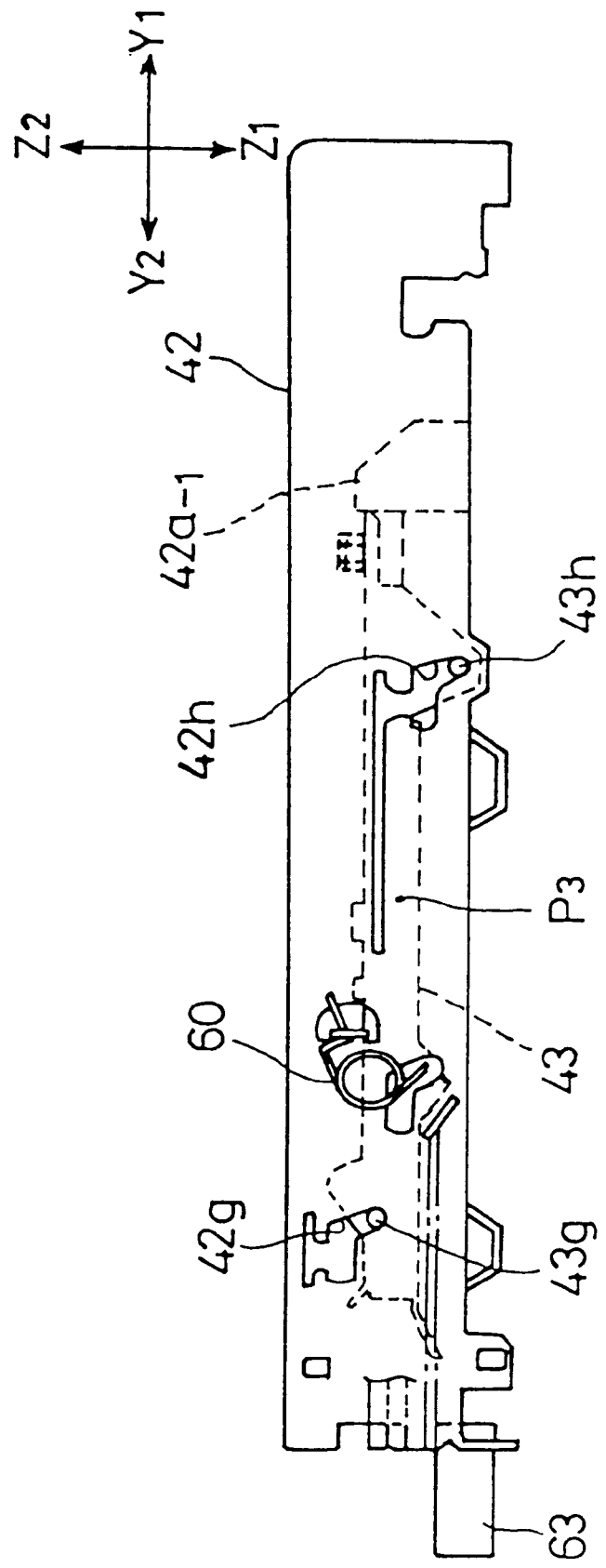
FIG. 13 shows a side view of the state where the magnetic disk has been loaded.

When the ejection button 63 is pressed in the Y1 direction in the state shown in FIG. 13, the ejection member 44 pushes up the holder 43 in the Z1 direction. Thereby, the magnetic disk 41b is removed from the turntable 51. Thus, the holder 43 reaches the position P2 shown in FIG. 11. Then, the holder 43 is caused to move in the Y2 direction by the forces of the approximately L-shaped torsion coil springs 60, 61. Thus, the holder 43 reaches the cartridge insertion and ejection position P1 shown in FIG. 8. As a result, the magnetic disk cartridge 41, held by the holder 43, is ejected. Then, the magnetic disk cartridge 41 is drawn out by an operator.

Figure 14:
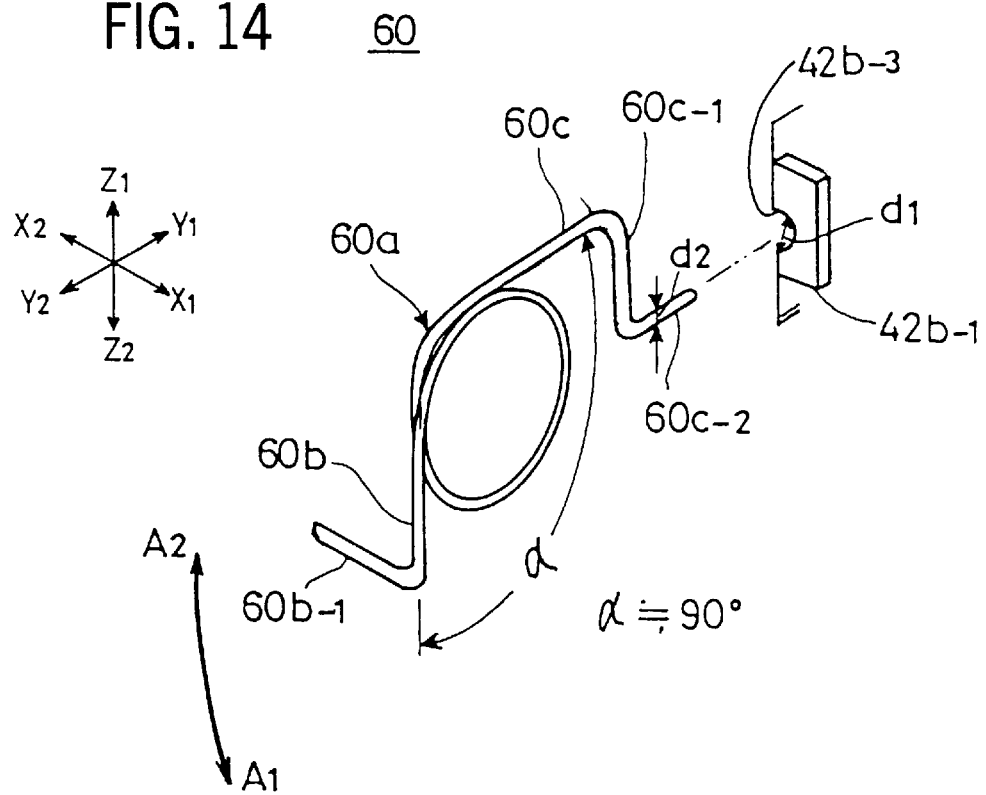
FIG. 14 shows a perspective view of an approximately L-shaped torsion coil spring.

As shown in FIG. 14, the approximately L-shaped torsion coil spring 60 includes a coil portion 60a of one turn, and two arm portions 60b, 60c extending from the coil portion 60a. The angle α between the arm portions 60b and 60c is slightly larger than 90 degrees.

The extending end of the arm portion 60b is bent to be L shaped and a hook portion 60b-1 is formed. The extending end of the arm portion 60c is bent to be shaped like a crank. The first L-shaped bent portion is a contact portion 60c-1 and the second L-shaped bent portion is a hook portion 60c-2, as shown in FIG. 14.

As shown in FIG. 5, in the side wall portion 42b of the frame 42, a lug portion 42b-1 is formed as a result of cutting and raising a portion of the side wall portion 42b. Further, in the side wall portion 42b, an approximately L-shaped opening 42b-2 is formed. In the lug portion 42b-1, a hole 42b-3 is formed. The diameter d1 of the hole 42b-3 is sufficiently larger than the diameter of the wire of the approximately L-shaped torsion coil spring 60.

As shown in FIG. 5, in the side wall portion 43b of the holder 43, a hole 43b-1 is formed. The position of the hole 43b-1 corresponds to the position of the approximately L-shaped opening 42b-2.

Figure 15A:
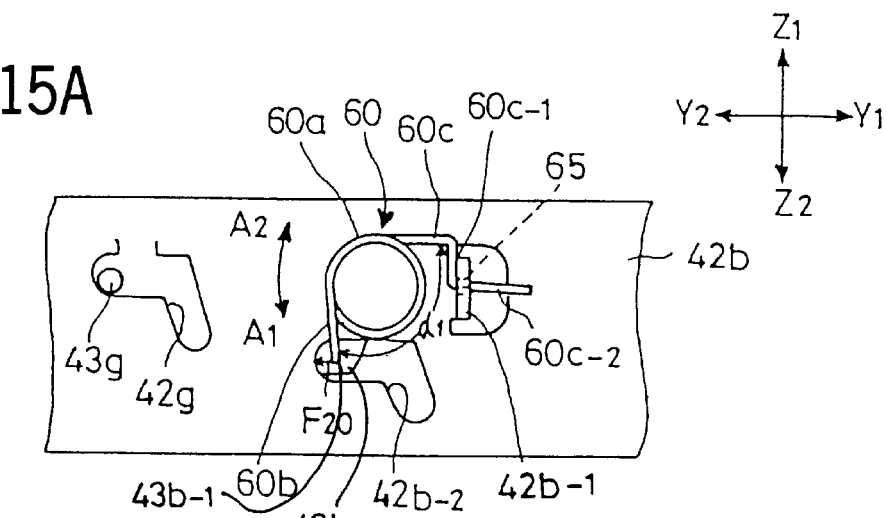
FIGS. 15A, 15B, 15C and 15D show operations of the torsion coil spring when the magnetic disk cartridge is loaded.

As shown in FIG. 15A, the hook portion 60b-1 of the arm portion 60b is inserted into the hole 43b-1 of the side wall portion 43b of the holder 43 through the approximately L-shaped opening 42b-2 of the side wall portion 42b of the frame 42. The hook portion 60c-2 of the extending end of the arm portion 60c is inserted into the hole 42b-3 of the lug portion 42b-1, as shown in FIG. 14. The hook portion 60c-2 is loose in the hole 42b-3. The contact portion 60c-1 comes into contact with the lug portion 42b-1, as shown in FIG. 15A. Thus, the torsion coil spring 60 is provided outside of the side wall portion 42b of the frame 42.

Because the hook portion 60c-2 in the hole 42b-3 is loose, the torsion coil spring 60 can freely rotate in A1 and A2 directions shown in FIG. 14, about the position 65, shown in FIG. 15A, at which the hook portion 60c-2 is in contact with the inner wall of the hole 43b-3, within a predetermined rotation range.

Because the contact portion 60c-1 is in contact with the lug portion 42b-1, Y1 direction movement of the torsion coil spring 60 is prevented. Also, A2 direction rotation of the torsion coil spring 60 is restricted.

The other torsion coil spring 61 has a shape which has mirror image symmetry with the shape of the torsion coil spring 60. In a manner similar to the manner in the case of the torsion coil spring 60, the approximately L-shaped torsion coil spring 61 is provided to the frame 42 and the holder 43.

Figure 15B:
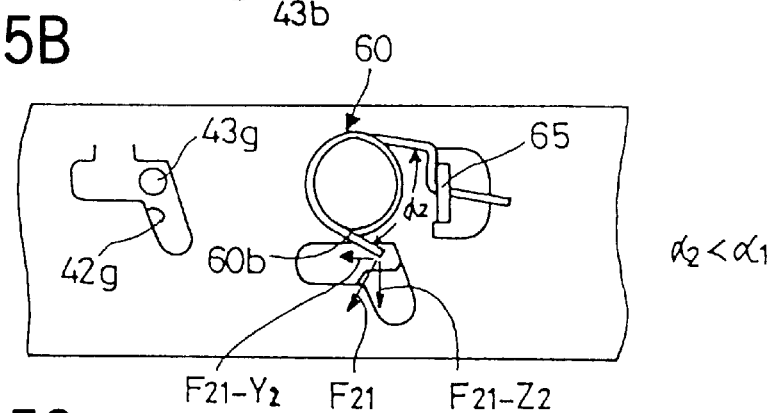
Figure 15C:
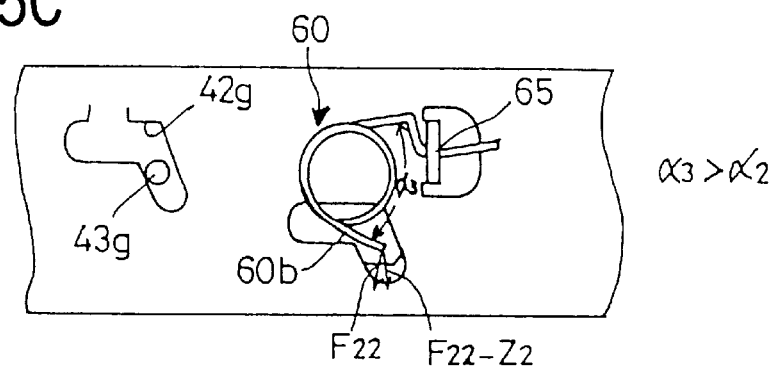
Figure 15D:
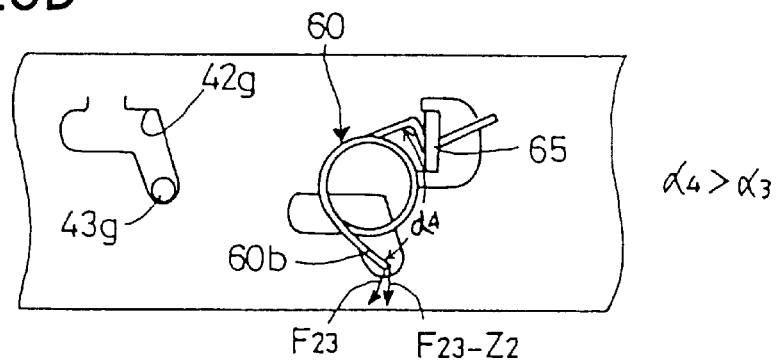

FIG. 15A shows the state where the holder 43 is at the cartridge insertion and ejection position P1. FIG. 15B shows the state where the holder 43 has reached the Y1 direction movement termination position (Z2 direction movement (downward movement) starting position) P2. FIG. 15C shows a state where the holder 43 is moving in the Z2 direction. FIG. 15D shows the state where the holder 43 has reached the cartridge loaded position P3.

When the holder 43 is in the cartridge insertion and ejection position P1, as shown in FIG. 15A, the torsion coil spring 60 is such that the arm portion 60c extends horizontally and the arm portion 60b extends vertically. The angle α1 between the arm portions 60b, 60c is slightly smaller than 90 degrees. At this time, the torsion coil spring 60 is slightly bent but is still approximately L shaped. The torsion coil spring 60 applies a small force F20 to the holder 43 in the Y2 direction. The length of an arrow representing a force represents the magnitude of the force.

When the magnetic disk cartridge 41 is inserted into the holder 43 in the Y1 direction and the holder 43 is pushed by the magnetic disk cartridge 41, the holder 43 moves in the Y1 direction. Thereby the torsion coil spring 60 slightly rotates in the A2 direction as shown in FIG. 15B. At this time, the arm portion 60b rotates in the A1 direction as shown in the figure. As a result, the angle between the arm portions 60b, 60c decreases to α2. As a result, the force which the torsion coil spring 60 applies to the holder 43 is a force F21. The force F21 is larger than the above-mentioned force F20. Also, the direction of the force F21 is a downward direction between the Y2 and Z2 directions. The force F21 includes the Y2 direction component force F21-Y2 and the Z2 direction component force F21-Z2. The properties of the torsion coil spring 60 are previously set such that the Z2 direction component force F21-Z2 is so strong that the Z2 direction component force F21-Z2 moves the holder 43 in the Z2 direction. As mentioned above, A2 direction rotation of the torsion coil spring 60 is restricted as a result of the contact portion 60c-1 of the torsion coil spring 60 being in contact with the lug portion 42b-1. Thereby, the direction of the force F21 is positively downward, and the holder 43 is effectively pushed in the Z2 direction. The Y2 direction component force F21-Y2 is a force which is applied to the magnetic disk cartridge 41 in the Y2 direction. Therefore, an operator applies the same force to the magnetic disk cartridge 41 in the Y1 direction so as to insert the magnetic disk cartridge. As shown in FIG. 15B, the Y2 direction component force F21-Y2 is relatively small. Therefore, the operator should apply merely a small force to the magnetic disk cartridge 41. Accordingly, the magnetic disk cartridge 41 insertion operation can be smoothly performed with a small effort.

When the holder 43 is pushed by the magnetic disk cartridge 41 and moves in the Y1 direction, the torsion coil spring 60 starts applying a force to the holder 43 in the Z2 direction. When the holder 43 has reached the Y1 direction movement termination position (Z2 direction movement (downward movement) starting position) P2, the torsion spring 60 applies the Z2 direction component force F21-Z2 to the holder 43 in the Z2 direction. The force F21-Z2 starts moving the holder 43 in the Z2 direction smoothly.

When the holder 43 moves in the Z2 direction along the holes 42g, 42h, 42i and 42j, the extending end of the arm portion 60b of the torsion coil spring 60 also moves in the Z2 direction. As a result, as shown in FIG. 15C, the angle between the arm portions 60a, 60b of the torsion coil spring 60 increase to α3. At this time, the torsion coil spring 60 rotates in the A1 direction about the above-mentioned position 65. Then, the force which the torsion coil spring 60 applies to the holder 43 is F22. As a result of the increase of the angle between the arm portions 60a, 60b, the spring force of the torsion coil spring 60 decreases. However, as a result of the A1 direction rotation of the torsion coil spring 60, the direction of the force F22 nears the Z2 direction. The Z2 direction components force F22-Z2 is approximately the same as the above-mentioned Z2 direction component force F21-Z2. Thereby, the holder 43 smoothly moves in the Z2 direction.

When the holder 43 has reached the cartridge loaded position P3, as shown in FIG. 15D, the extending end of the arm portion 60b further has moved in the Z2 direction. Thereby, the angle between the arm portions 60a, 60b of the torsion coil spring 60 has further increased to α4. Further, the torsion coil spring 60 rotates about the above-mentioned position 65 in the A1 direction. At this time, the force which the torsion coil spring 60 applies to the holder 43 is F23. As a result of the increase of the angle between the arm portions 60a, 60b of the torsion coil spring 60, the spring force of the torsion coil spring 60 decreases. However, as a result of the A1 direction rotation of the torsion coil spring 60, the direction of the force F23 nears the Z2 direction. The Z2 direction component force F23-Z2 is approximately the same as the above-mentioned Z2 direction component F21-Z2. Accordingly, the holder 43 is stably maintained at the cartridge loaded position.

As described above, the torsion coil spring 60 rotates in the A1 direction as the holder 43 moves. Thereby, the spring force of the torsion coil spring 60 efficiently acts as the force pushing the holder 43 in the Z2 direction. Accordingly, it is possible to use the torsion coil spring 60 of a relatively weak spring force. When the torsion coil spring 60 of a relatively weak spring force is used, the speed at which the holder 43 moves to the cartridge loaded position is low. Therefore, without providing a damper such as that described above for decelerating the holder, it is prevented that the magnetic disk 41b and/or magnetic heads 53, 54 are damaged. By omitting such an oil damper, the costs of the magnetic disk cartridge loading device 40 can be reduced. Further, as shown in FIG. 7, a side projecting amount 'a' of each of the torsion coil springs 60, 61 is small. Therefore, the width of the magnetic disk cartridge loading device 40 can be reduced and thus it is possible to miniaturize the magnetic disk cartridge loading device.

When the loaded magnetic disk cartridge 41 is ejected, the torsion coil spring 60 operates in the order of FIG. 15D→FIG. 15C→FIG. 15B→FIG. 15A. The holder 43 moves upward in the Z1 direction against the forces F23-Z2, F22-Z2. However, because the forces F23-Z2, F22-Z2 are not strong, the force applied to the ejection button 63 by an operator should not be so strong. Therefore, an ejection button 63 pressing operation can be smoothly performed.

As a result of the contact portion 60c-1 coming into contact with the lug portion 42b-1, A2 direction rotation of the torsion coil spring 60 is limited so that the torsion coil spring 60 does not rotate in the A2 direction from the position shown in FIG. 15B. Thereby, the force F21-Y2, which moves the holder 43 in the Y2 direction, can be effectively obtained from the torsion coil spring 60.

The operation of the torsion spring coil 61 is similar to the operations of the coil spring 60 described above with reference to FIGS. 15A, 15B, 15C and 15D. The corresponding operations of the torsion coil springs 60, 61 are performed simultaneously.

Figure 16:
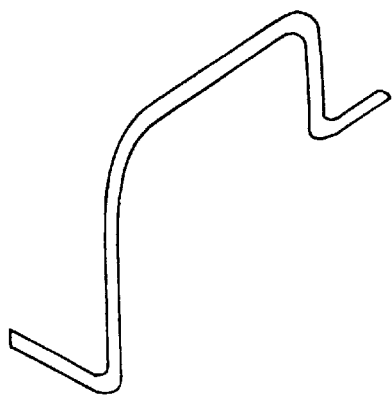
FIG. 16 shows a perspective view of an approximately L-shaped spring.

Instead of the torsion coil spring 60, it is also possible to use an approximately L-shaped spring 60A shown in FIG. 16. The spring 60A is formed as a result of bending a metal wire to be approximately L shaped. When using the spring 60A, a similar effect can be obtained.

Figure 17:
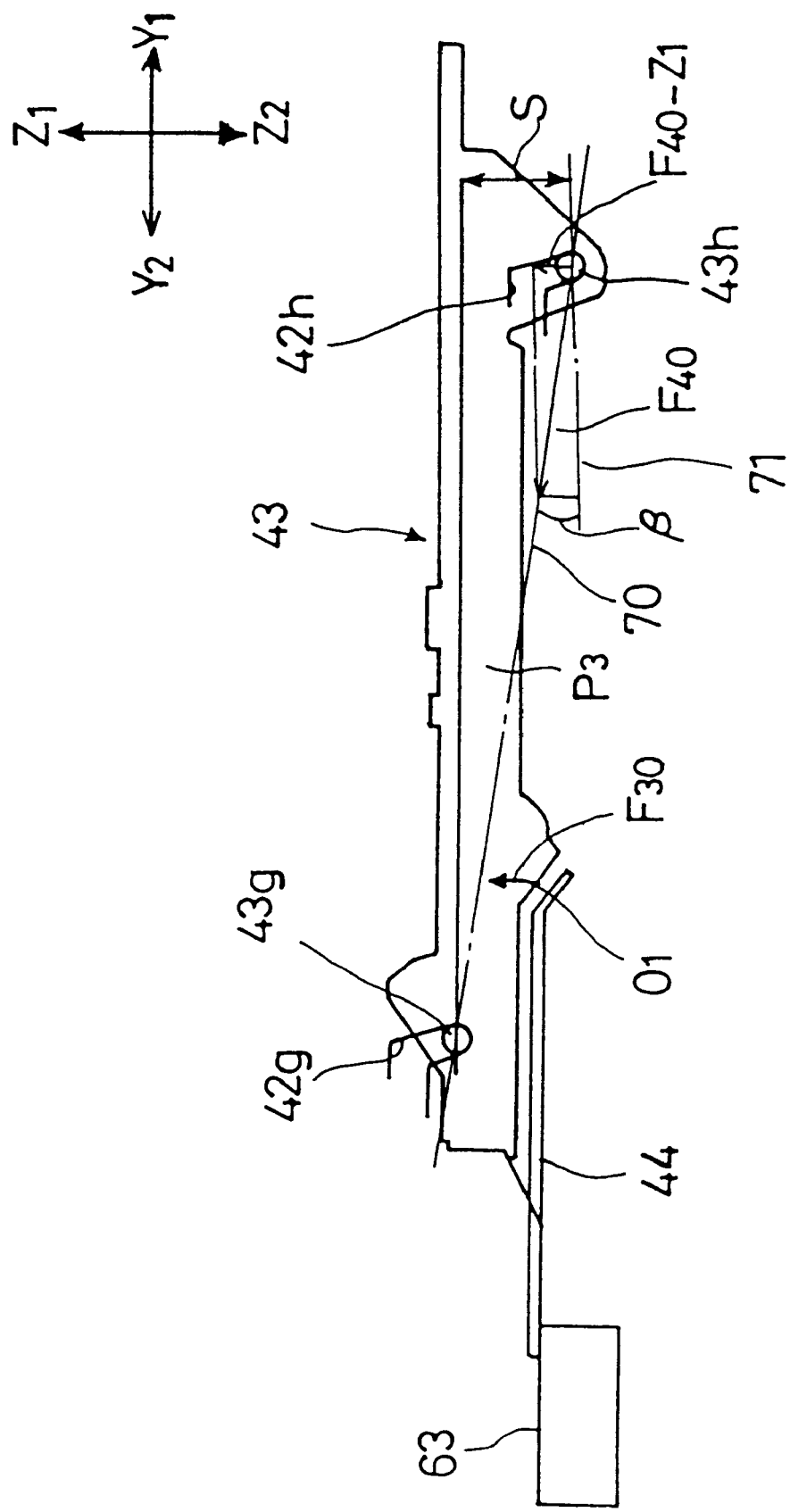
FIG. 17 illustrates that an upward force is applied to a rear side pin of the holder when the magnetic disk cartridge is ejected.

FIG. 17 shows the state where the holder 43 is at the cartridge loaded position P3. The rear side pin 43h is lower than the insertion side pin 43g by a distance S. The rear side pin guiding hole 42h and the insertion side pin guiding hole 42g are located at the positions corresponding to those of the rear side pin 43h and insertion side pin 43g, respectively. When the ejection button 63 is pressed in the Y1 direction, a position O1 of the holder 43 is pushed up by a force F30. The position O1 is nearer to the insertion side pin 43g than to the rear side pin 43h. Thereby, at first, the insertion side pin 43g moves in the Z1 direction along the insertion side pin guiding hole 42g. As a result of the moving of the insertion side pin 43g, a force F40 is applied to the rear side pin 43h, the direction of the force F40 being along the straight line 70 between the insertion side pin 43g and the rear side pin 43h.

Because the angle between the straight line 70 and a horizontal line 71 is β, the force F40 includes the Z1 direction component force F40-Z1. By this component force F40-Z1, the rear side pin 43h moves along the rear side pin guiding hole 42h, and the holder 43 reaches the cartridge insertion and ejection position P1. Thus, by merely pushing up any single position of the holder 43, the holder 43 at the cartridge loaded position P3 smoothly starts moving to the cartridge insertion and ejection position P1. It is not necessary to push up the rear side pin 43h and the insertion side pin 43g simultaneously. Therefore, it is not necessary to strictly manage dimensions of components/parts. Accordingly, the magnetic disk cartridge loading device 40 can be easily manufactured.

Figure 18A:
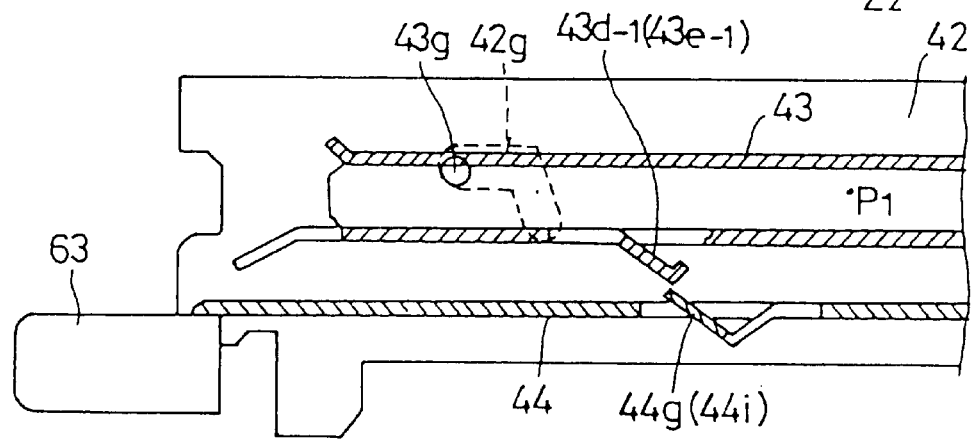
FIGS. 18A, 18B and 18C show a movement of the holder with respect to an ejection member when the magnetic disk cartridge is loaded.
Figure 18B:
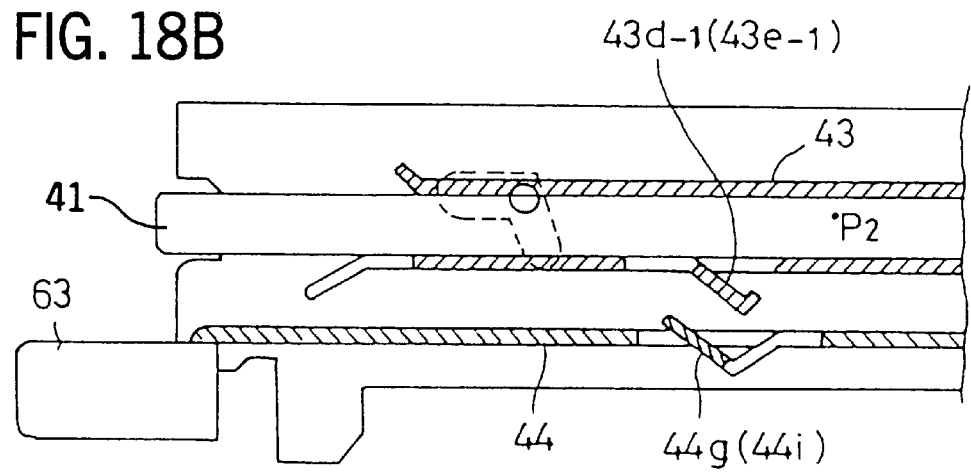
Figure 18C:
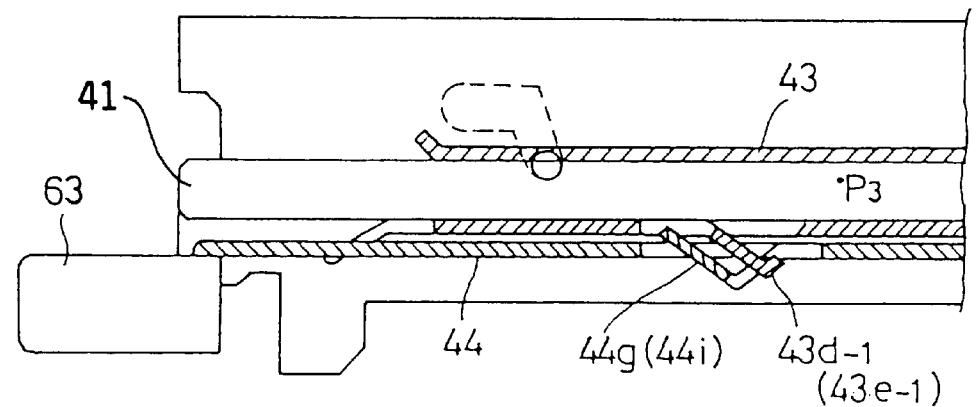
Figure 19A:
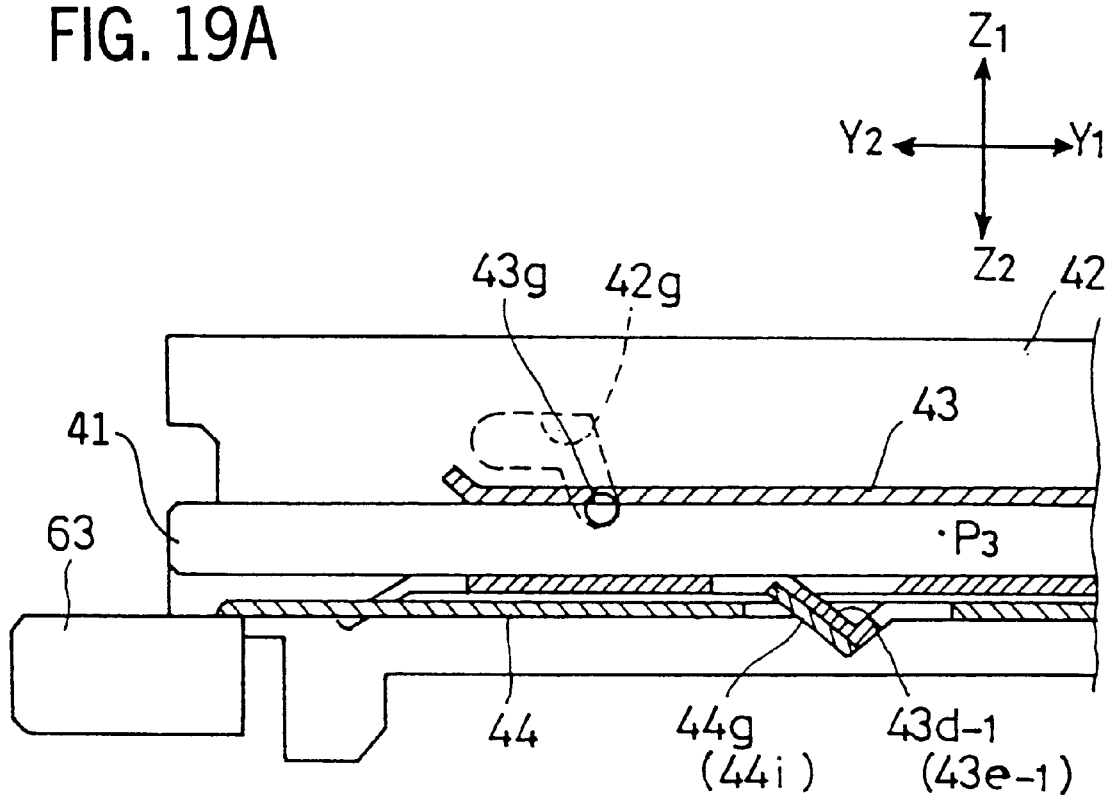
FIGS. 19A and 19B illustrate an upward movement of the holder as a result of the ejection member being pushed into the device.
Figure 19B:
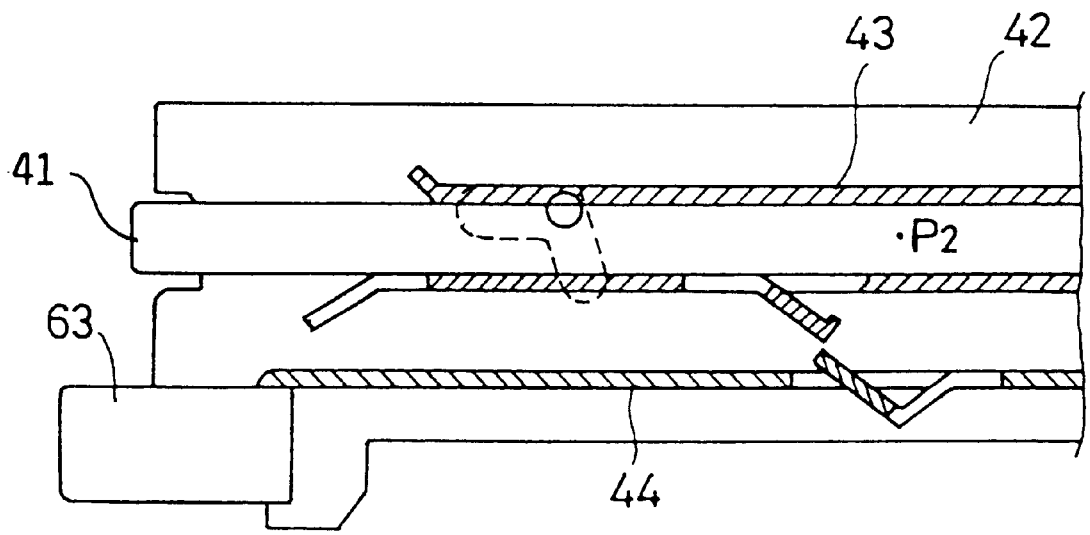

FIG. 18A shows the state in which the holder 43 is at the cartridge insertion and ejection position P1. FIG. 18C shows the state in which the holder 43 has reached the cartridge loaded position P3. FIG. 18B shows the state in which the holder 43 is being loaded. FIG. 19A shows the state immediately after the state in which the ejection button 63 is pressed in the Y1 direction. FIG. 19B shows the holder 43 being ejected.

As shown in FIGS. 5, 9 and 18A, in the arm portion 44a of the ejection member 44, guiding holes 44e, 44f and a pushing-up piece 44g are formed. In the arm portion 44b, a guiding hole 44h and a pushing-up piece 44i are formed.

The ejection member 44 is placed on projections 42k, 42l and 42m (shown in FIGS. 4 and 5) provided on the bottom plate portion 42a of the frame. Further, guiding pieces 42o, 42p and 42q (shown in the figures) of the frame 42 are inserted into the guiding holes 44e, 44h and 44f of the ejection member 44, respectively. The guiding pieces 42o, 42p and 42q are formed as a result of cutting and raising portions of the bottom plate portion 42a of the frame 42. Thus, the ejection member 44 is supported on the frame 42, and, as the guiding pieces 42o, 42p and 42q are movable in the guiding holes 44e, 44h and 44f, respectively, the ejection member 44 is movable in the Y1 and Y2 directions. As shown in FIG. 5, the spring 62 is provided between the ejection member 44 and the frame 42. Thereby, the ejection member 44 moves in the Y2 direction and comes into contact with stopper pieces 42r, 42s (shown in FIGS. 4, 5) of the frame 42. As shown in FIG. 7, the ejection button 63, fixed to the ejection member 44, projects in the Y2 direction from the frame 42.

As shown in FIG. 9, the ejection member 44 is provided above the bottom plate portion 42a of the frame 42 and below the holder 43. The ejecting member 44 is positioned slightly upwardly apart from the bottom plate portion 42a of the frame 42. Movement of the ejection member 44 in the Z1, Z2 directions are restricted by the above-mentioned projections 42k, 42l, 42m and stopper pieces 42t, 42u shown in FIGS. 4, 5. The stopper pieces 42t, 42u come into contact with the top surface of the ejection member 44 when the ejection member moves upward so that the upward movement of the ejection member 44 is limited.

The above-mentioned pushing-up pieces 44g, 44i incline so that the Y1 direction ends are lower than the Y2 direction ends, respectively, as shown in FIG. 18A. The positions of the pushing-up pieces 44g, 44i are the same in the Y1, Y2 directions. As shown in FIGS. 5, 9 and 18A, in the bottom plate portion 43d of the holder 43, a pushed-up piece 43d-1 is formed. In the bottom plate portion 43e of the holder 43, a pushed-up piece 43e-1 is formed. The pushed-up pieces 43d-1, 43e-1, the same as the above-mentioned pushing-up portions 44g, 44i, incline so that the Y1 ends thereof are lower than the Y2 ends thereof, respectively, as shown in FIG. 18A. The positions of the pushed-up pieces 44d-1 and 44e-1 are the same in the Y1, Y2 directions. When the ejection member 44 is not operated and the holder 43 is at the cartridge insertion and ejection position P1, as shown in FIG. 18A, the pushed-up piece 44d-1 (44e-1) is positioned above and in the Y2 direction from the pushing-up piece 44g (44i).

When the magnetic disk cartridge 41 is inserted into the holder 43, the holder 43 reaches the position P2 shown in FIG. 18B and then reaches the cartridge loaded position P3. The pushed-up piece 43d-1 (43e-1) moves above the pushing-up piece 44g (44i) in the Y1 direction, and then, moves in the Z2 directions. Thus, the pushed-up piece 43d-1 (43e-1) reaches the level the same as the level of the pushing-up piece 44g (44i), and faces the pushing-up piece 44g (44i) in the Y1 direction, as shown in FIG. 18C.

Then, when the ejection button 63 is pressed by an operator in the Y1 direction, as shown in FIG. 19A, the pushing-up piece 44g (44i) comes into contact with the pushed-up piece 43d-1 (43e-1), pushes the pushed-up piece 43d-1 (43e-1), and pushes up the pushed-up piece 43d-1 (43e-1) in the Z1 direction as shown in FIG. 19B. Thereby, the holder 43 is pushed up in the Z1 direction as shown in the figure, and then moves in the Y2 direction by the spring force of the above-mentioned torsion coil spring 60. Thus, the holder 43 reaches the cartridge insertion and ejection position P1 shown in FIG. 18A.

Thus, the ejection member 44 does not have portions which are located outside of the side surfaces of the holder 43. Accordingly, the width W2 of the magnetic disk cartridge loading device 40, shown in FIG. 9, can be reduced.

As shown in FIG. 6, the lower cover 46 is provided with supporting pieces 46a, 46b, 46c and 46d in four positions along the periphery of the lower cover 46. Each of the pieces 46a, 46b, 46c and 46d is formed as a result of bending the side walls of the lower cover 46 inwardly. As shown in FIG. 9, the periphery of the bottom plate portion 42a of the frame 42 is supported on the supporting pieces 46a, 46b, 46c and 46d, and screws 75 are used to fix the frame 42 to the lower cover 46.

Figure 20:
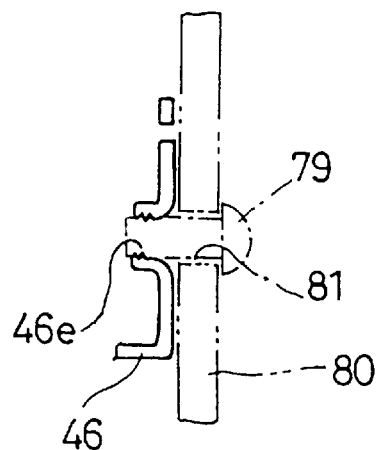
FIG. 20 shows a part of FIG. 9 encircled by a circle A, and shows that the magnetic disk cartridge loading device is screwed to a computer apparatus body.

At a plurality of positions of side walls of the lower cover 46, screw holes 46e are formed as a result of performing burring and tapping. As shown magnified in FIG. 20, in the magnetic disk cartridge loading device 40, screws 79 pass through holes 81 of a frame mechanism portion 80 of a computer apparatus body, and are screwed into the screw holes 46e of the two side walls of the lower cover 46. Thus, the frame mechanism portion 80 of the computer apparatus body is screwed to the lower cover 46, and the lower cover 46 is fixed to the frame mechanism portion 80 of the computer apparatus body.

In FIG. 6, the thickness t10 of the sheet metal of the frame 42 and the thickness t11 of the sheet metal of the upper cover 45 and lower cover 46 are the same. However, actually, the thickness t10 is approximately 1 mm while the thickness t11 is approximately 0.5 mm, that is, the thickness t11 is approximately half the thickness t10. Therefore, the lower cover 46 is likely to be bent. When there are dimension discrepancies between the frame mechanism portion 80 of the computer apparatus body and the magnetic disk cartridge loading device 40, the lower cover 46 is appropriately bent and thus the dimension discrepancies are flexibly absorbed by the lower 46 cover. As a result, no distortion occurs in the frame 42. Accordingly, when the screws 79 are screwed so that the disk cartridge loading device 40 is fixed to the frame mechanism portion 80 of the computer apparatus body via the lower cover 46, this does not adversely affect the characteristics of the magnetic disk cartridge loading device 40.

Figure 21:
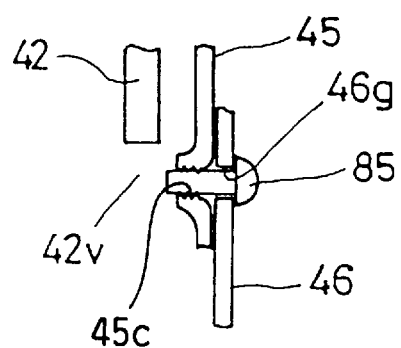
FIG. 21 shows a part of FIG. 9 encircled by an elongated circle B, and shows that a lower cover is screwed to an upper cover.

As shown in FIG. 6, the supporting pieces 46a, 46c of the lower cover 46 are inserted into slits 45a, 45b of the upper cover 45. Further, as shown in FIGS. 6, 9 and 21, a screw 85 passes through a hole 46g of the lower cover and is screwed into a screw hole 45c of the upper cover 45. Thus, the lower cover 46 is fixed to the upper cover 45. As shown in FIG. 6 and 21, an opening 42v is formed in the frame 42 at the position at which the screw 85 projects. Accordingly, the screw 85 is prevented from coming into contact with the frame 42, and the frame is prevented from being distorted.

Figure 22:
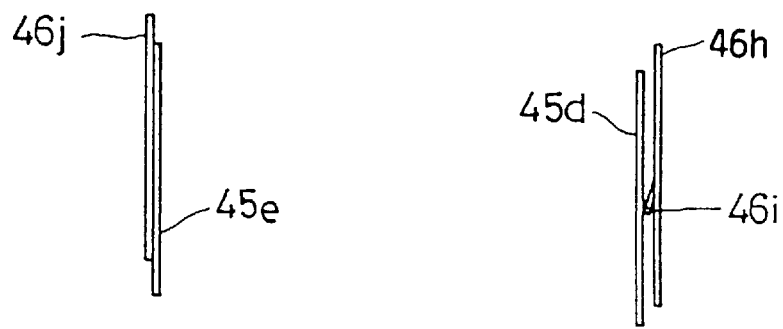
FIG. 22 illustrates that the lower cover and upper cover are fixed to one another in a manner such that an undesirable movement of one with respect to the other does not occur.

As shown in FIG. 6, a cut and raised piece 46i is formed in a right side wall portion 46h of the lower cover 46. As shown in FIG. 22, the cut and raised piece 46i of the right side wall portion 46h of the lower cover 46 pushes a right side wall portion 45d of the upper cover 45, and a left side wall portion 45e of the upper cover 45 pushes a left side wall portion 46j of the lower cover 46. Accordingly, the upper cover 45 and lower cover 46 are electrically connected. Thereby, a good shield effect is obtained, and also, the upper cover 45 and lower cover 46 are assembled without undesirable movement of one portion with respect to the other portion in the X1, X2 direction.

An erroneous insertion prevention member 90, shown in FIGS. 4 and 5, is provided inside of the right side wall portion 42b of the frame 42, as shown in FIG. 7. The erroneous insertion prevention member 90 is formed as a result of bending a metal wire, and has elasticity. As shown in the figure, the erroneous insertion prevention member 90 has a stopper portion 90a which extends in the Z2 direction. The magnetic disk cartridge 41 has an oblique portion 41c in one corner as shown in FIG. 4. The magnetic disk cartridge should be inserted into the holder 43 in the correct orientation, that is, the oblique portion 41c should be positioned on the right side. In this case, the stopper portion 90a slides on the oblique portion 41c and moves in the X1 direction. Thus, the stopper portion 90a does not act to prevent the magnetic disk cartridge 41 from being inserted. Therefore, the magnetic disk cartridge 41 is inserted as shown in FIG. 12.

Figure 23:
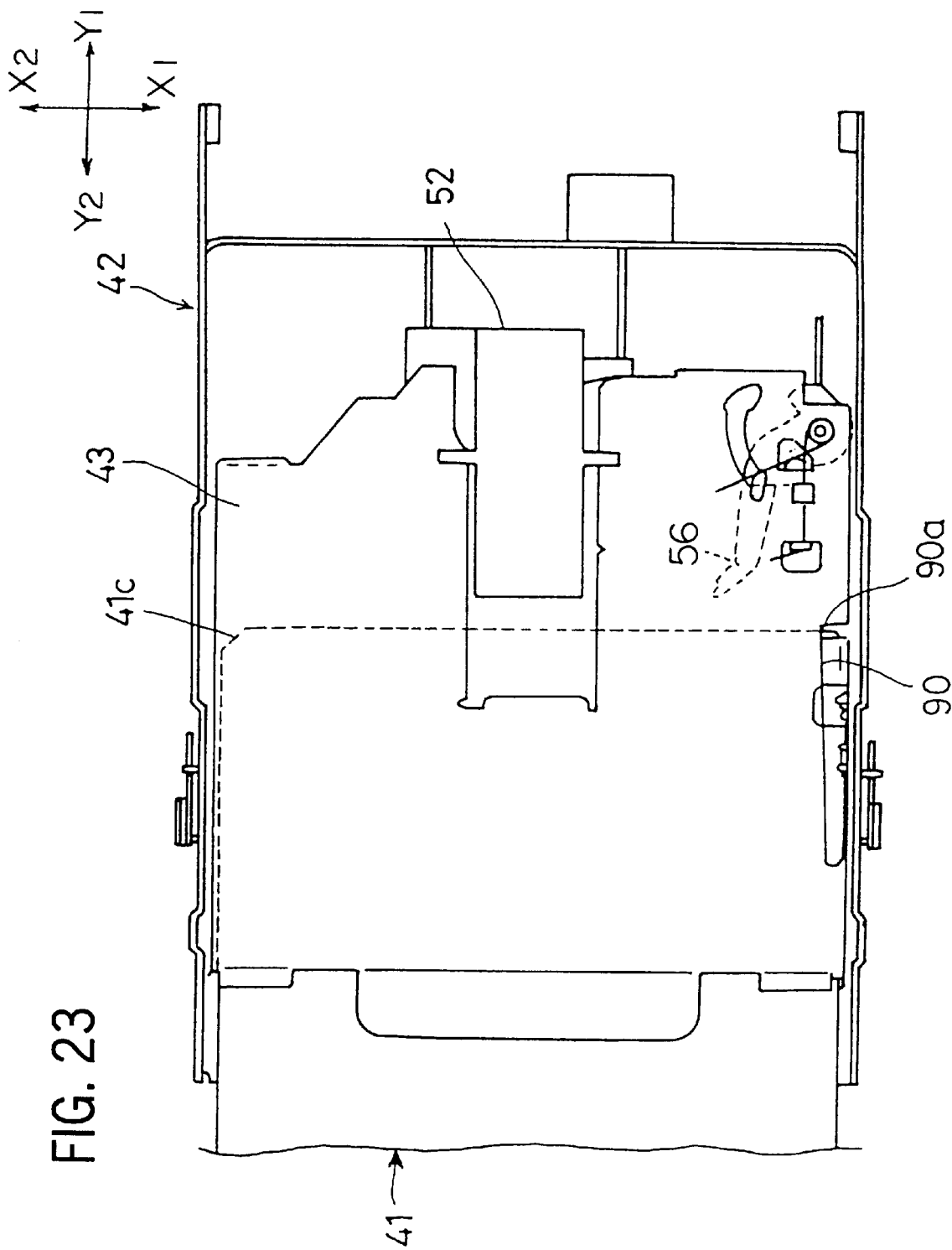
FIG. 23 shows a mechanism for preventing erroneous-orientation insertion of the magnetic disk cartridge.

However, when the magnetic disk cartridge 41 is inserted in an incorrect orientation, that is, the oblique portion 41c is not positioned on the right side, the front surface of the magnetic disk cartridge 41 comes into contact with the stopper portion 90a as shown in FIG. 23. Because the front surface of the magnetic disk cartridge 41 is perpendicular to the disk cartridge insertion direction, the stopper portion 90a does not slide on the front surface of the magnetic disk cartridge 41. The stopper portion 90a prevents the magnetic disk cartridge 41 from being further inserted. It is not possible to further insert the magnetic disk cartridge 41. Thus, the magnetic disk cartridge does not come into contact with the lever 56. Thus, erroneous orientation insertion of the magnetic disk cartridge can be prevented.

Application of the present invention is not limited to the application to the magnetic disk cartridge loading device. It is also possible to apply the present invention to a disk cartridge loading device for a cartridge containing another type of disk such as a magneto-optical disk. It is also possible to apply the present invention to a cartridge loading device for a tape cartridge.

With reference to drawings, a second embodiment of the present invention will now be described.

Figure 24:
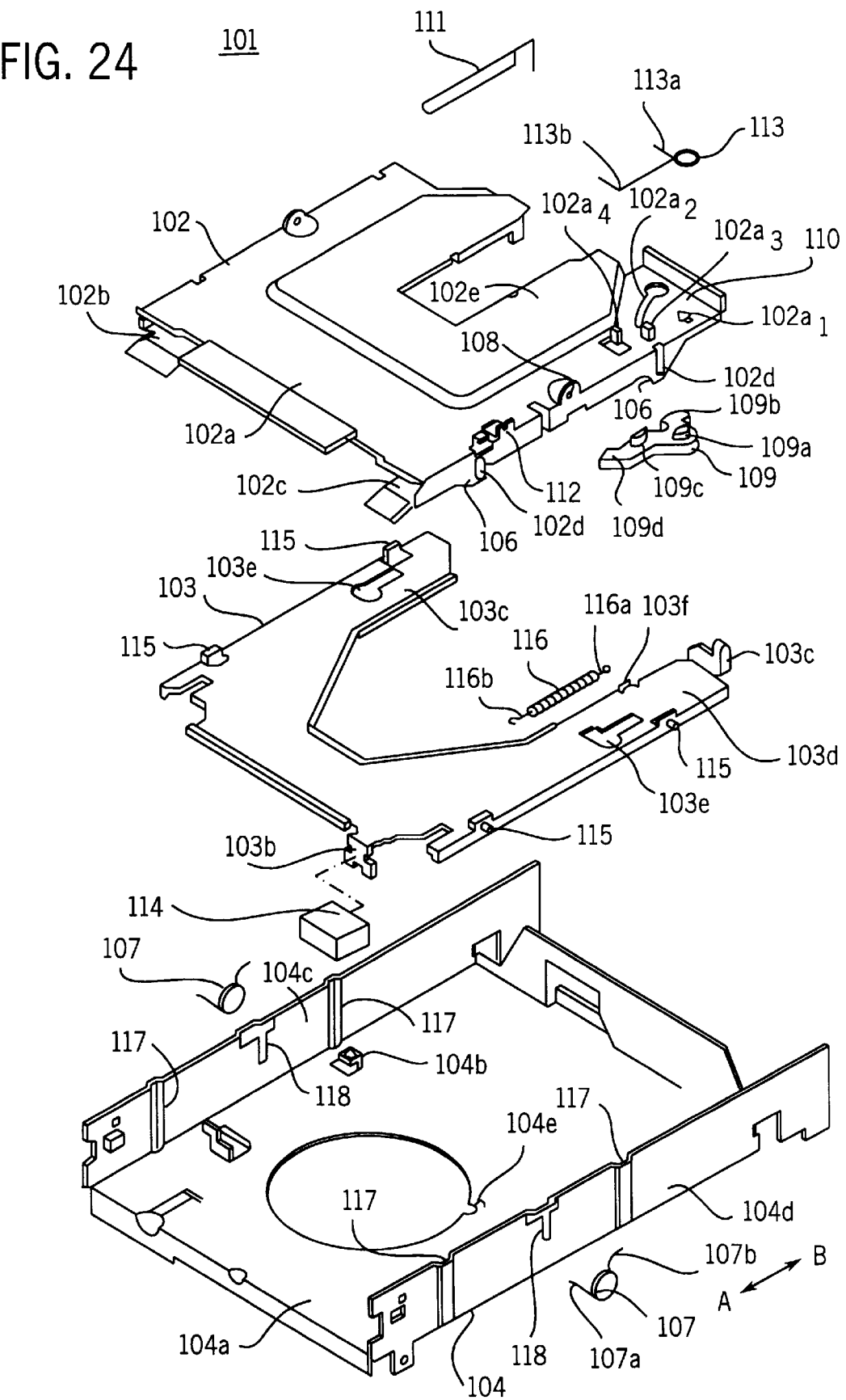
FIG. 24 shows an exploded perspective view of a disk cartridge loading device in a second embodiment of the present invention.
Figure 25:
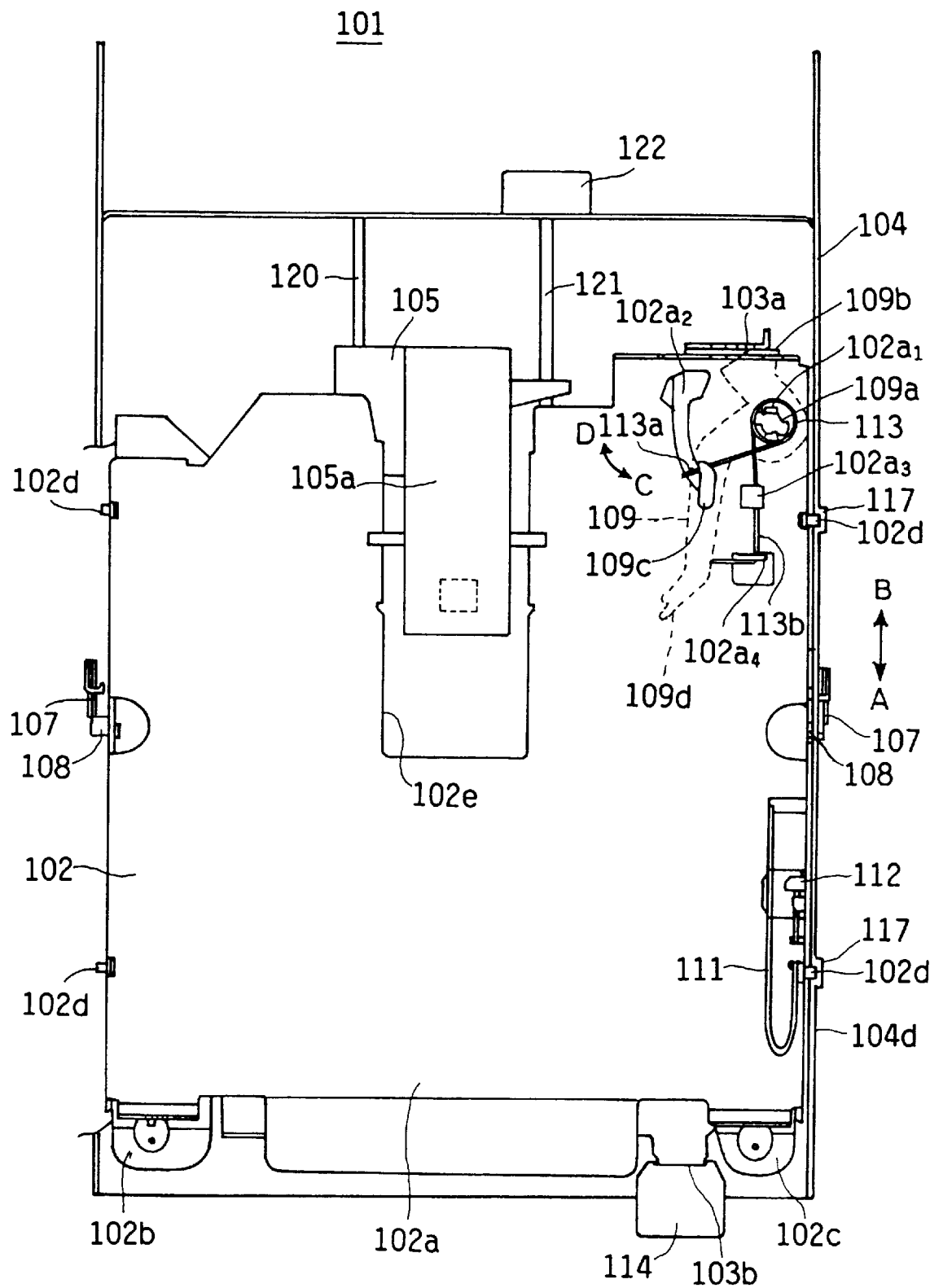
FIG. 25 shows a plan view of the disk cartridge loading device.
Figure 26:
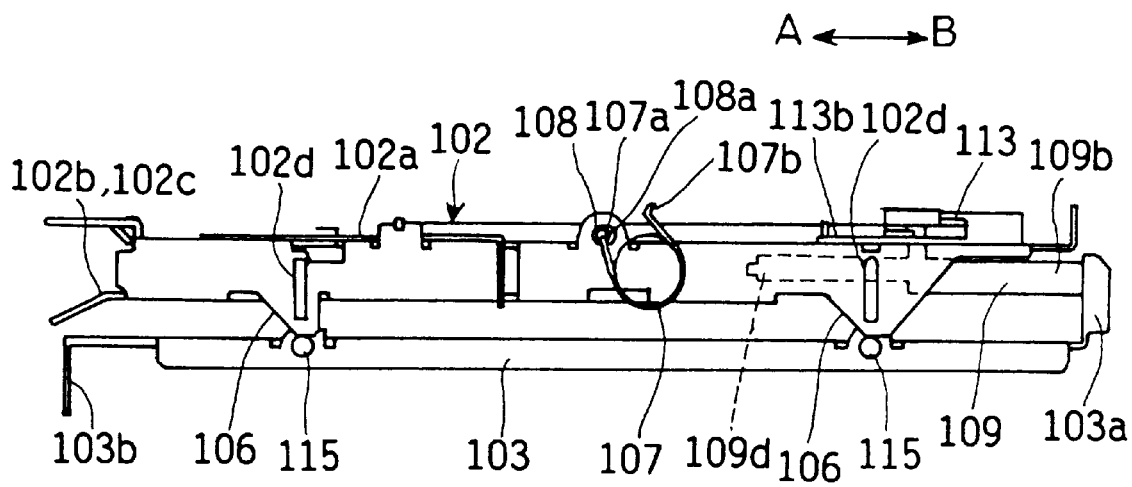
FIG. 26 shows a side elevational view of the disk cartridge loading device.
Figure 27:
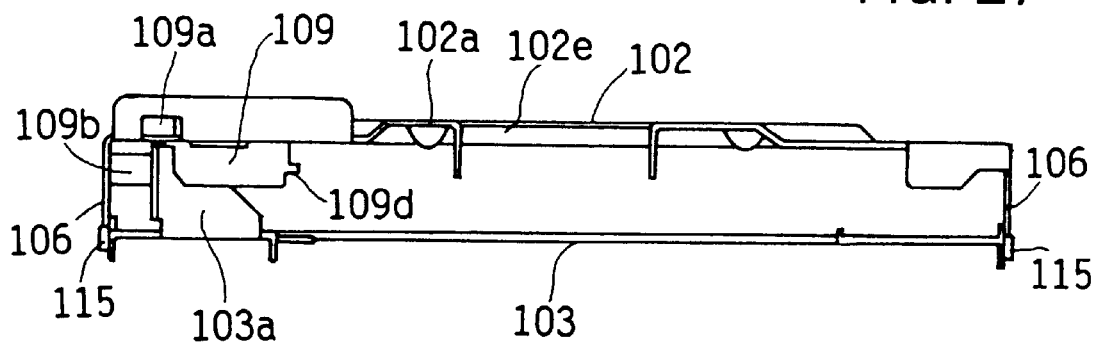
FIG. 27 shows a rear elevational view of the disk cartridge loading device.

FIG. 24 shows an exploded perspective view of a disk cartridge loading device according to the present invention. FIG. 25 shows a plan view of the disk cartridge loading device. FIG. 26 shows a side view of the disk cartridge loading device. FIG. 27 shows a rear view of the disk cartridge loading device. In FIGS. 26 and 26, a chassis 104 is omitted.

The disk cartridge loading device 101 includes a holder 102 into which a disk cartridge (not shown in the figures) is inserted, a slider (sliding member) 103 which slides forward and backward (A and B directions) and raises and lowers the holder 102, and the chassis 104 which supports the slider 103 in a manner such that the slider 103 can slide. On a bottom plate 104a of the chassis 104, a turntable (not shown in the figures), which is driven by a disk rotating motor, and a head carriage 105, which supports magnetic heads, are mounted. The head carriage 105 is supported by a guiding shaft 120 and a leading screw 121 on both sides. The guiding shaft 120 and leading screw 121 are in parallel with one another. When a stepping motor 122 drives and rotates the leading screw 121, the head carriage 105 moves in one of the A direction and the B direction according to the rotation direction of the leading screw 121.

The holder 102 includes a top plate 102a and cartridge guiding portions 102b, 102c which are bent so as to hold a disk cartridge from both sides. A cartridge insertion portion, which is a space, is formed as a result of being enclosed by the top plates 102a and the both side cartridge guiding portions 102b, 102c. On both sides of the cartridge guiding portions 102b and 102c, projections 102d extend vertically. The projections 102d guide rising and falling of the holder 102.

An opening 102e is formed in the top plate 102a, a head arm 105a moving in the opening 102e. Inclined cams 106 are provided on the bottom of both side walls of the cartridge guiding portions 102b and 102c. The inclined cams 106 also guide the rising and falling operations of the holder 102. Cylindrical bosses 108 project from both sides at the middle of the top portions of the cartridge guiding portions 102b, 102c.

A spring hooking hole 108a is formed in each of the cylindrical bosses 108, the hole 108a passing through the inside of the boss 108. The periphery of each boss 108 functions as a guiding portion for guiding the rising and falling operations of the holder 102, as will be described later. One end 107a of a holder pushing spring (pushing member) 107 is hooked to the spring hooking hole 108a of each boss 108 and the spring force of the holder pushing spring 107 pushes the holder 102.

In the top plate 102a of the holder 102, a shutter arm mounting portion 110, to which a shutter arm 109 for opening and closing the shutter of a disk cartridge (not shown in the figures) is mounted, and a spring hooking portion 112, to which an erroneous insertion prevention spring 111 is hooked, are provided.

The shutter arm 109 includes a shaft 109a, which is inserted into a hole $102_{a1}$ of the top plate 102, a latch portion 109b, which is hooked to a latch hooking portion 103a of the slider 103, an engagement portion 109c, which engages with an arc hole $102_{a2}$, and a contact portion 109d which comes into contact with a side portion of the shutter of the disk cartridge.

A shutter arm spring 113 is wound onto the shaft 109a of the shutter arm 109. One end 113a of the shutter arm spring 113 comes into contact with the engagement portion 109c of the shutter arm 109. The other end 113b of the shutter arm spring 113 is hooked to spring hooking portions $102_{a3}$, $102_{a4}$ of the top plate 102a of the holder 102. Thereby, the shutter arm 109 is pushed by the spring force of the shutter arm spring 113 counterclockwise (in a C direction).

When the disk cartridge is inserted into the cartridge guiding portions 102a, 102b of the holder, the contact portion 109d of the shutter arm 109 is pushed in an insertion direction (a B direction) and rotates clockwise. By the rotation operation of the shutter arm 109, the shutter of the cartridge slides in an opening direction.

The slider 103 has an ejection button fixing portion 103b to which an ejection button 114 is fixed. In arm portions 103c, 103d, which extend backward, guide holes 103e, into which guiding portions 104b are inserted, respectively, are formed. The guiding portions 104b project from the bottom plate 104a of the chassis 104. Further, in each side of the slider 103, two pins 115 are provided which slide on the above-mentioned inclined cams 106 of the holder 102, respectively.

At the extending end of the arm portion 103d, the latch hooking portion 103a, which is hooked by the latch portion 109b of the shutter arm 109, stands. Inside of the arm portion 103d, a spring hooking portion 103f is provided. One end 116a of a slider returning coil spring 116 is hooked to the spring hooked portion 103f and the other end 116b of the coil spring 116 is hooked to a spring hooking portion 104e provided on the bottom plate of the chassis 104. By the spring force of the coil spring 116, the slider 103 is pulled in the A direction.

Before the disk cartridge is inserted, the latch hooking portion 103a of the slider 103 moves to the B direction and is in contact with the latch portion 109b of the shutter arm 109. Thereby, the slider 103 is prevented from moving in the A direction. When the disk cartridge is inserted, the shutter arm 109 rotates clockwise (in a D direction). Thereby, the prevention of the slider 103 from moving in the A direction as a result of the latch portion 109b of the shutter arm 109 being in contact with the latch hooking portion 103a of the slider 103 is removed. Then, the slider slides in the A direction by the spring force of the coil spring 116.

On the inside surface of each of both side walls 104c and 104d of the chassis 104, a pair of guiding grooves 117 are formed. The projections 102d of the holder 102 are inserted into the guiding grooves 117, respectively. Thus, the projections 102d of the holder 102 can rise and fall in the guiding grooves, respectively, and thereby, the guiding grooves 117 guide the rising and falling of the holder 2.

Between each pair of the guiding grooves, a T-shaped spring hooking hole 118 is formed. The spring hooking holes 118 include guiding portions 118a, into which the cylindrical bosses 108 projecting to both sides from both side walls of the holder 102 are inserted, respectively. The guiding portion 118a guides vertical movement of the holder 102. Each spring hooking hole 118 further includes a spring hooking portion 118b. The spring hooking portion 118b extends horizontally from the top end of the guiding portion 118a. To the spring hooking portion 118b, the other end 107b of the holder pushing spring 107 is hooked.

A horizontal extending portion 119 which extends horizontally above the spring hooking hole 118 projects externally so that the horizontal extending portion 119 does not extend immediately above the guiding portion 118a. Thereby, in an assembling stage, the cylindrical bosses 108 can be inserted into the guiding portions 118a from the top side.

As shown in FIGS. 26, 27, in an assembling stage, the holder 102 is laid on the slider 103 and the horizontal portion of each inclined cam 106 comes into contact with the respective pin 115. The end 107a of each holder pushing spring 107 is inserted into the spring hooking hole 108a of the respective cylindrical boss 108 and is hooked to the spring hooking hole 108a.

Then, the projections 102d of the holder 102 are inserted into the guiding grooves 117 provided in the both side walls 104c, 104d, respectively. The cylindrical bosses 108 are inserted into the guiding portions 118a of the spring hooking hole 118. Then, the other end 107b of the holder pushing spring 107 is hooked to the spring hooking portion 118b.

Thus, the holder 102, slider 103 and chassis 104 are temporarily assembled as one assembly by the holder pushing springs 107. Thus, merely by mounting the holder pushing springs 107, the holder 102, slider 103 and chassis 104 are easily assembled. It is not necessary to use fixing members such as screws or the like. An assembling work amount can be reduced and work efficiency can be improved.

Figure 28:
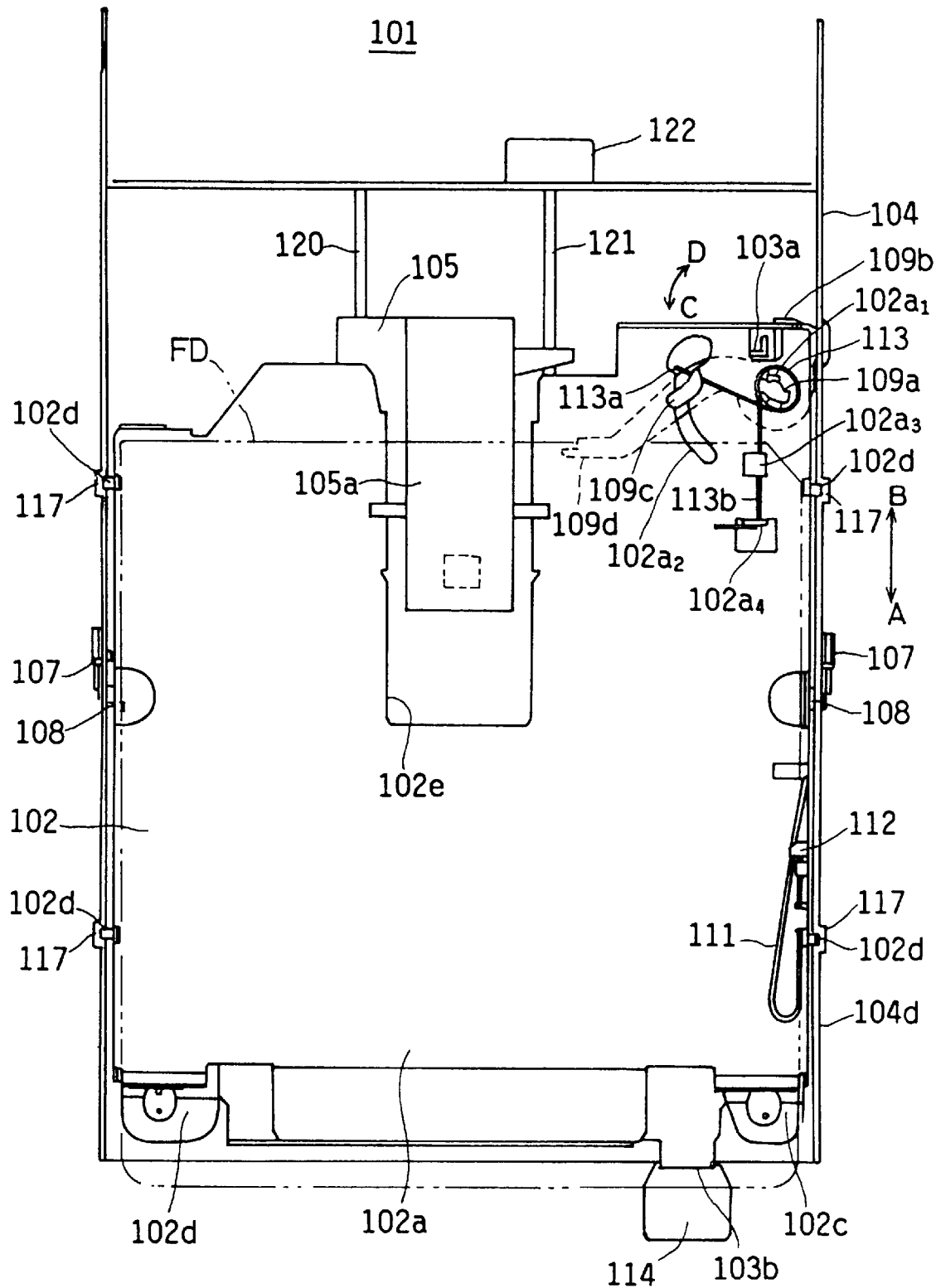
FIG. 28 shows a plan view of the disk cartridge loading device in a state in which a disk cartridge has been loaded.
Figure 29:
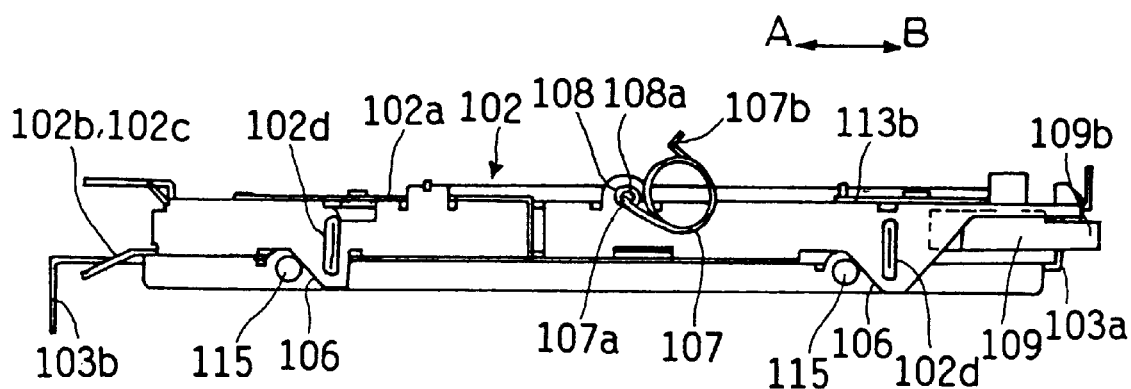
FIG. 29 shows a side elevational view of the disk cartridge loading device in the state in which the disk cartridge has been loaded.
Figure 30:
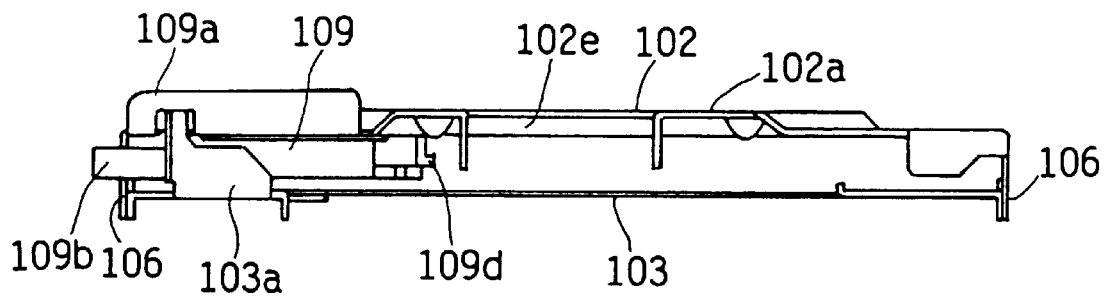
FIG. 30 shows a rear elevational view of the disk cartridge loading device in the state in which the disk cartridge has been loaded.

A loading operation performed when the disk cartridge is inserted will now be described. FIG. 28 shows a plan view of the disk cartridge loading device in a state where the disk cartridge has been loaded. FIG. 29 shows a side view of the disk cartridge loading device in the state where the disk cartridge has been loaded. FIG. 30 shows a rear view of the disk cartridge loading device in the state where the disk cartridge has been loaded. In FIGS. 29, 30, indication of the chassis 104 is omitted.

As shown in FIG. 28, when the disk cartridge FD is inserted into the holder 102, an end portion, extending in the B direction, of the erroneous insertion prevention spring 111 moves rightward and allows the insertion of the disk cartridge FD. Further, the contact portion 109d of the shutter arm 109 is pushed by the disk cartridge FD and the shutter arm 109 rotates clockwise (in the D direction). Thereby, the shutter of the disk cartridge slides in the opening direction. Also, as result of the clockwise rotation of the shutter arm 109, the latch portion 109b of the shutter arm 109 is removed from the latch hooking portion 103a and the prevention of the A direction movement of the slider 103 is removed. Then, the slider slides in the A direction by the spring force of the coil spring 116.

As mentioned above, in the related art, the spring force of one coil spring is used for both applying power to the slider and applying power to the holder. In this embodiment, the slider pulling coil spring 116 and the holder pushing spring 107 are provided individually. Accordingly, only by the spring force of the holder pushing spring 107, the holder 102 can be maintained in the cartridge loaded position. Therefore, the spring force of the spring 116 can be set to an amount necessary only to slide the slider 103. Thus, the spring force of the spring 116 can be reduced and an oil damper or the like to decelerate the slider is not needed.

Further, as a result of reducing the spring force of the coil spring 116, friction between the latch portion 109b and the latch hooking portion 103a is reduced. Thereby, the rotation operation of the shutter arm 109 is smoothly performed, and also, frictional wear of the latch portion 109b and the latch hooking portion 103a can be reduced.

When the slider 103 slides in the A direction by the spring force of the spring 116, the pins 115 projecting outwardly from the both sides of the slider 103 also moves in the A direction. As a result, the pins 115 slide on the inclined cams 106 and thereby the holder 102 falls from the cartridge insertion and ejection position to the cartridge loaded position. At this time, by the holder pushing spring 107, the holder is pushed and moved downward, and is maintained at the cartridge loaded position.

Figure 31:
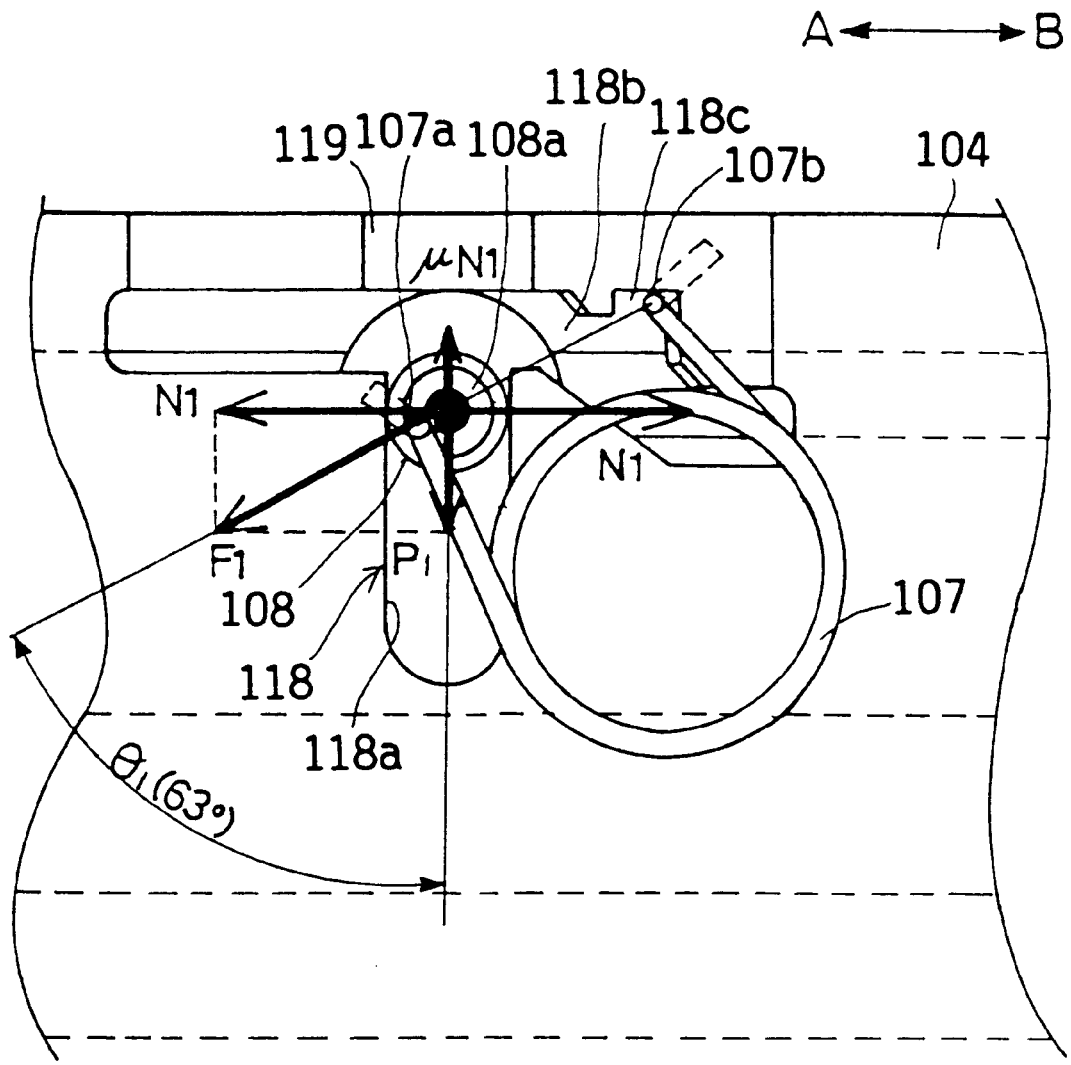
FIG. 31 shows a partial magnified view of the disk cartridge loading device in a state in which a holder is at a cartridge insertion and ejection position.
Figure 32:
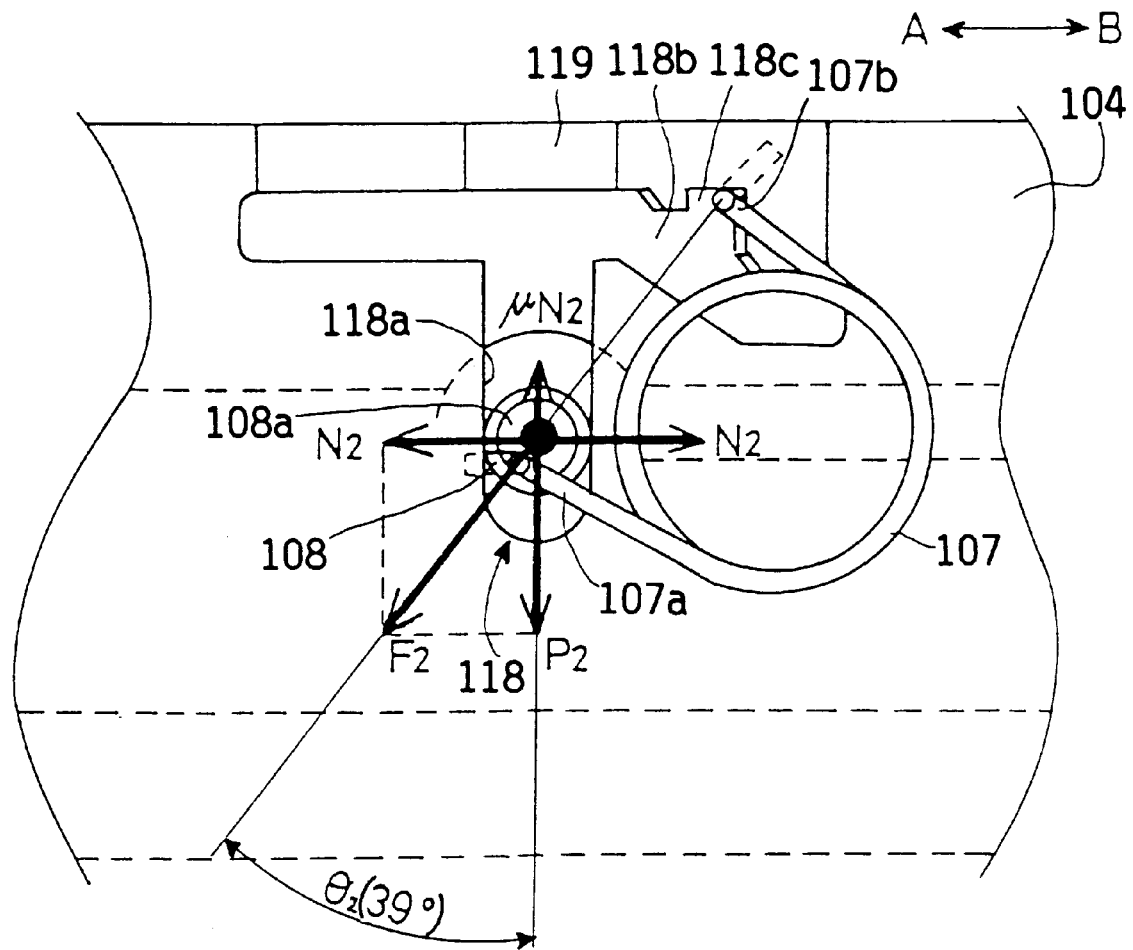
FIG. 32 shows a partial magnified view of the disk cartridge loading device in a state in which a holder is at a cartridge loaded position.

FIG. 31 shows the state where the holder 102 is at the cartridge insertion and ejection position. FIG. 32 shows the state where the holder 102 is at the cartridge loaded position.

As shown in FIG. 31, the end 107a of each holder pushing spring 107 is hooked to the spring hooking hole 108a of the respective cylindrical boss 108. The other end 107b of each holder pushing spring 107 is hooked to a cut-out portion 118c of the spring hooking portion 118b of the respective spring hooking hole 118. When the holder 102 is positioned at the top position, that is, at the insertion and ejection position, each cylindrical boss 108 is positioned at the top portion of the guiding portion 118a of the respective spring hooking hole 118. Therefore, the holder pushing spring 107 applies a force $F_1$ to the cylindrical boss 108 in the direction at an angle $\theta_1$ to the vertical direction. In this embodiment, $\theta_1=63°$. This force $F_1$ includes the vertical component force $P_1$ and the horizontal component force $N_1$. In this state, as shown in FIG. 31, $P_1<N_1$. Thus, the force $N_1$ which pushes the cylindrical boss 108 horizontally is larger than the force $P_1$ which pushes the cylindrical boss 108 downward.

Thus, when the holder 102 is at the cartridge insertion and ejection position, the force $P_1$ with which each holder pushing spring 107 pushes the respective cylindrical boss 108 downward is small while the force $N_1$ with which each holder pushing spring 107 pushes the cylindrical boss 108 to an edge of the guiding portion 118a of the respective spring hooking hole 118 is large. As a result, the friction between each cylindrical boss 108 and the respective guiding portion 118a is large. Thereby, undesirable vertical movement of the holder 102 is not likely to occur. Thus, the holder is stably maintained at the cartridge insertion and ejection position.

When the holder 102 falls to the cartridge loaded position, as shown in FIG. 32, the holder pushing spring 107 applies a force $F_2$ to the cylindrical boss 108 in the direction at an angle $\theta_2$ to the vertical direction. In this embodiment, $\theta_2=39°$. The force $F_2$ includes the vertical component force $P_2$ and the horizontal component force $N_2$. In this state, as shown in FIG. 32, $P_2>N_2$. The force $P_2$ with which the cylindrical boss 108 is pushed downward is larger than the force $N_2$ with which the cylindrical boss 108 is pushed horizontally.

In the process in which the holder 102 and each cylindrical boss 108 falls, the vertical component force gradually increases while the horizontal component force gradually decreases. As a result of the horizontal component force decreasing with the falling of each cylindrical boss 108, the friction between each cylindrical boss 108 and the guiding portion 118a of the respective spring hooking hole 118 gradually decreases. As the pins 115 move in the A direction and slide on the inclined cams 106, respectively, the holder 102 smoothly falls.

When the holder is at the cartridge loading position, the force $P_1$ with which each holder pushing spring 107 pushes the respective cylinder boss 108 downward is large, while the force $N_1$ with which each holder pushing spring 107 pushes the respective cylinder boss 108 to the edge of the guiding portion 118a of the respective spring hooking hole 118 is small. Thereby, the force of pushing and holding the holder 102 at the cartridge loaded position increases. Thereby, by the spring force of the holder pushing springs 107, the holder 102 is stably maintained at the cartridge loaded position.

Therefore, the disk of the disk cartridge FD inserted into the holder 102 is positively chucked onto a turntable (not shown in the figures) and magnetic information recording and reproducing can be stably performed. Thus, in the disk cartridge loading device, the loading operation of the holder 102 can be positively performed. Further, the spring force of the coil spring 116 which pulls the slider 103 can be reduced.

Thereby, a shock when the magnetic heads come into contact with the disk surfaces can be reduced. As a result, it is prevented that the disk surfaces are damaged by the shock. Therefore, it is not necessary to provide an oil damper or the like, which is needed in the related art as mentioned above. By omitting such an oil damper, the disk cartridge loading device can be miniaturized, and also, the costs thereof can be reduced.

When ejecting the loaded disk cartridge, the ejection button 114 is pushed and moved in the B direction and the slider moves in the B direction. As a result, the pins 115 move in the B direction and slide on the inclined cams 106, respectively. Thereby, the holder 102 is allowed to rise. At this time, the vertical component force P gradually deceases as the holder rises. Accordingly, as the ejection button 114 is pushed and moved in the B direction, the force to be applied to the button for causing the holder 102 to rise decreases. Thus, by the holder pushing spring 107, the ejection operation can be smoothly performed.

FIG. 33 shows a graph of chucking load change in the case of the second embodiment of the present invention and chucking load change in the case of the related art. In the case of the related art, the chucking load is largest ($P_1'$) at the loading start, and is smallest ($P_2'$) at the loading finish.

In contrast to this, inverse to the case of the related art, in the case of the embodiment of the present invention, the chucking load is smallest ($P_1$) at the loading start, and is largest ($P_2$) at the loading finish. Thereby, the chucking of the disk of the disk cartridge onto the turntable can be positively performed. Further, even in high temperature, it is prevented that the deceleration of the slider 103 is not performed sufficiently and the disk surfaces are hit by the magnetic heads so strongly that the disk surfaces are damaged.

As the second embodiment of the present invention, the loading device for loading the flexible magnetic disk has been described. However, the present invention can also be applied to other disk apparatus such as an optical disk apparatus, a magneto-optical disk apparatus and so forth.

Further, the structure of the holder pushing spring 107 is not limited to the structure of the holder pushing spring 107 in the second embodiment. Instead of the torsion spring, a compression coil spring can be used.

Further, in the embodiment, the slider slides below the holder. However, the present invention can also be applied to an arrangement in which the slider slides above the holder.

Further, the present invention is not limited to the above-described embodiments, and variations and modifications may be made without departing from the scope of the present invention indicated in the appended claims.

What is claimed is:

1. A disk cartridge loading device, comprising:

a sliding member which slides when a disk cartridge is inserted in a holder;

a chassis for supporting said sliding member in a manner such that said sliding member can side with respect to said chassis;

said holder moving between a cartridge insertion and ejection position and a cartridge loaded position by the sliding operation of said sliding member;

a pushing member, one end of said pushing member being hooked to said holder and another end of said pushing member being hooked to said chassis, wherein said pushing member is arranged such that, during a process in which said holder moves from said cartridge insertion and ejection position to said cartridge loaded position with the sliding operation of said sliding member, a force with which said pushing member pushes said holder to said cartridge loaded position increases gradually; and wherein said pushing member arrangement is such that, during the process in which said holder moves from said cartridge insertion and election position to said cartridge loaded position with the sliding operation of said sliding member, an inclining angle of a pushing direction in which said pushing member pushes said holder to the cartridge loading direction becomes smaller.

2. The disk cartridge loading device, according to claim 1, wherein:
   said pushing member comprises a torsion spring;
   one arm of said torsion spring is hooked to said holder and another arm of said torsion spring is hooked to said chassis; and
   the angle between the two arms of said torsion spring gradually increases during a process in which said holder moves from said cartridge insertion and ejection position to said cartridge loaded position with the sliding operation of said sliding member.

3. The disk cartridge loading device, according to claim 1, wherein said pushing member arrangement is such that, during a process in which said holder moves from said cartridge loaded position to said cartridge insertion and ejection position with the sliding operation of said sliding member, a force with which said pushing member pushes said holder to said chassis increases gradually.

4. The disk cartridge loading device, according to claim 1, wherein, as said holder moves from said cartridge insertion and ejection position to said cartridge loaded position, the angle between a pushing direction in which said pushing member pushes said holder and a cartridge loading direction becomes smaller and the cartridge loading direction component of the force with which said pushing member pushes said holder becomes larger.

* * * * *